(12) United States Patent
Lee et al.

(10) Patent No.: US 8,738,719 B2
(45) Date of Patent: *May 27, 2014

(54) IMAGE BASED ELECTRONIC MAIL SYSTEM

(71) Applicant: Social Concepts, Inc., Redwood City, CA (US)

(72) Inventors: Joseph W. Lee, Los Angeles, CA (US); Michael R. Hedlund, Los Gatos, CA (US); Peter A. Grendler, San Francisco, CA (US)

(73) Assignee: Social Concepts, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/781,245

(22) Filed: Feb. 28, 2013

(65) Prior Publication Data

US 2013/0179520 A1    Jul. 11, 2013

Related U.S. Application Data

(63) Continuation of application No. 11/619,520, filed on Jan. 3, 2007, now Pat. No. 8,413,059.

(51) Int. Cl.
    G06F 15/16    (2006.01)
    G06F 15/177   (2006.01)

(52) U.S. Cl.
    USPC ............................... 709/206; 709/221

(58) Field of Classification Search
    USPC ......................................... 709/206
    See application file for complete search history.

(56) References Cited

U.S. PATENT DOCUMENTS 5,680,455 A * 10/1997 Linsker et al. ............... 380/246
5,774,870 A    6/1998 Storey
5,826,244 A   10/1998 Huberman
5,831,590 A   11/1998 Ikedo
6,064,978 A    5/2000 Gardner
6,252,588 B1   6/2001 Dawson
6,263,381 B1   7/2001 Freadman
6,515,681 B1   2/2003 Knight
6,571,279 B1   5/2003 Herz
6,661,438 B1  12/2003 Shiraishi
6,779,178 B1 *  8/2004 Lloyd et al. .................. 717/174
6,793,128 B2   9/2004 Huffman (Continued)

OTHER PUBLICATIONS

David Mazieres and M. Frans Kaashoek, The Design, Implementation and Operation of an Email Pseudonym Server; Jul. 31, 1998; Laboratory for computer Science; pp. 1-19.

"HTML Marquee Code." Free Webmaster Tutorials—Quackit.com. Nov. 2005. Web Jan. 10, 2012 <http://web.archive.ordweb/20061108085214/http://quackit.com/html/codes/html_marquee_code.cfm>; 5 pages.

SoftComplex Inc., "Tigra Scroller PRO—Demo #1 (Vertical automatic scrolling)", Dec. 31, 2005; http://web.archive.or/web/20051231062850/http://www.softcomplex.com/products/tigra_scroller_pro/demo1.html.

(Continued)

*Primary Examiner* — Tamara T Kyle
*Assistant Examiner* — Margishi Desai
(74) *Attorney, Agent, or Firm* — Stolowitz Ford Cowger LLP

(57) ABSTRACT

An image based email system associates images with different electronic mail (email) senders. The email system receives email messages from different email senders and then looks through either website member profiles or user contacts for associated images. Any located image is displayed in a list of recent senders. This allows the email user to associate recently received email messages with particular sender images or photographs. The images can also be used in a list of favorite or most frequent email senders. Other features of the email system extract information from received email messages to better identify the email senders. These and other features of the email system provide more intuitive and easier to perform email operations.

37 Claims, 19 Drawing Sheets

(56) References Cited

U.S. PATENT DOCUMENTS

| | | | |
|---|---|---|---|
| 6,898,631 B1 | 5/2005 | Kraft | |
| 6,901,151 B1 | 5/2005 | Rosenbaum | |
| 6,983,309 B1 | 1/2006 | Yoshizawa | |
| 6,985,248 B2 | 1/2006 | Parulski | |
| 7,020,650 B2 | 3/2006 | Sato | |
| 7,023,979 B1* | 4/2006 | Wu et al. | 379/265.11 |
| 7,034,871 B2 | 4/2006 | Parulski | |
| 7,037,195 B2 | 5/2006 | Schneider | |
| 7,111,317 B1 | 9/2006 | McIntyre | |
| 7,117,370 B2 | 10/2006 | Khan | |
| 7,158,945 B1 | 1/2007 | Wolcott | |
| 7,174,312 B2 | 2/2007 | Harper | |
| 7,177,044 B2* | 2/2007 | Tachiyama | 358/1.15 |
| 7,194,253 B2* | 3/2007 | Ritter et al. | 455/414.1 |
| 7,240,022 B1 | 7/2007 | Bistriceanu | |
| 7,289,110 B2* | 10/2007 | Hansson | 345/173 |
| 7,308,277 B2* | 12/2007 | Yomoda | 455/466 |
| 7,312,827 B2 | 12/2007 | Cazier | |
| 7,464,137 B2 | 12/2008 | Zhu | |
| 7,523,385 B2 | 4/2009 | Nguyen | |
| 7,530,021 B2 | 5/2009 | Cheng | |
| 7,627,311 B2 | 12/2009 | Oijer | |
| 7,653,648 B2 | 1/2010 | Pacholec | |
| 7,660,854 B2* | 2/2010 | Sorotzkin | 709/206 |
| 7,740,538 B2 | 6/2010 | Nguyen | |
| 7,788,387 B2 | 8/2010 | Kumar | |
| 7,797,529 B2 | 9/2010 | Jiang | |
| 7,813,822 B1* | 10/2010 | Hoffberg | 700/94 |
| 7,827,208 B2 | 11/2010 | Bosworth | |
| 7,920,626 B2* | 4/2011 | Fernandez et al. | 375/240.16 |
| 7,945,653 B2 | 5/2011 | Zuckerberg | |
| 8,014,763 B2* | 9/2011 | Hymes | 455/414.2 |
| 8,022,926 B2 | 9/2011 | Arai | |
| 8,127,009 B2* | 2/2012 | Pinder et al. | 709/225 |
| 8,166,407 B2 | 4/2012 | Lee | |
| 8,180,852 B2 | 5/2012 | Lee | |
| 8,190,681 B2 | 5/2012 | Markus | |
| 8,200,808 B2 | 6/2012 | Ishida | |
| 8,413,059 B2 | 4/2013 | Lee | |
| 8,600,830 B2* | 12/2013 | Hoffberg | 705/26.3 |
| 8,601,062 B2* | 12/2013 | Buchheit et al. | 709/206 |
| 2001/0019359 A1 | 9/2001 | Parulski | |
| 2001/0028467 A1 | 10/2001 | Ishihara | |
| 2002/0049632 A1 | 4/2002 | Parkinson | |
| 2002/0070945 A1 | 6/2002 | Kage | |
| 2002/0116266 A1 | 8/2002 | Marshall | |
| 2002/0116508 A1 | 8/2002 | Khan | |
| 2002/0133637 A1 | 9/2002 | Popp | |
| 2002/0191223 A1 | 12/2002 | Ishikawa | |
| 2003/0005058 A1 | 1/2003 | Sorotzkin | |
| 2003/0063913 A1 | 4/2003 | Yamazaki | |
| 2003/0100360 A1 | 5/2003 | Manfredi | |
| 2003/0105820 A1 | 6/2003 | Haims | |
| 2003/0125080 A1 | 7/2003 | Shimamura | |
| 2003/0125107 A1 | 7/2003 | Cannon | |
| 2003/0227479 A1 | 12/2003 | Mizrahi | |
| 2003/0231207 A1 | 12/2003 | Huang | |
| 2004/0088325 A1 | 5/2004 | Elder | |
| 2004/0093281 A1 | 5/2004 | Silverstein | |
| 2004/0122803 A1 | 6/2004 | Dom | |
| 2004/0133480 A1 | 7/2004 | Domes | |
| 2004/0137882 A1 | 7/2004 | Forsyth | |
| 2004/0221224 A1 | 11/2004 | Blattner | |
| 2004/0224703 A1 | 11/2004 | Takaki | |
| 2004/0233471 A1 | 11/2004 | Inoue | |
| 2004/0243424 A1 | 12/2004 | Jeong | |
| 2004/0254928 A1 | 12/2004 | Vronay | |
| 2004/0259630 A1 | 12/2004 | Huard | |
| 2005/0043992 A1 | 2/2005 | Cohagan | |
| 2005/0055272 A1 | 3/2005 | Ryan | |
| 2005/0075889 A1 | 4/2005 | Gomes | |
| 2005/0078804 A1 | 4/2005 | Yomoda | |
| 2005/0080845 A1 | 4/2005 | Gopinath | |
| 2005/0081142 A1 | 4/2005 | Popp | |
| 2005/0086211 A1 | 4/2005 | Mayer | |
| 2005/0097024 A1 | 5/2005 | Rainey | |
| 2005/0102381 A1 | 5/2005 | Jiang | |
| 2005/0125505 A1 | 6/2005 | Kim | |
| 2005/0154639 A1 | 7/2005 | Zetmeir | |
| 2005/0159970 A1* | 7/2005 | Buyukkokten et al. | 705/1 |
| 2005/0193054 A1 | 9/2005 | Wilson | |
| 2005/0222985 A1 | 10/2005 | Buchheit | |
| 2005/0262203 A1 | 11/2005 | Buchheit | |
| 2005/0273344 A1 | 12/2005 | Lee | |
| 2005/0273377 A1 | 12/2005 | Ouimet | |
| 2006/0004619 A1 | 1/2006 | Matheson | |
| 2006/0004703 A1 | 1/2006 | Spivack | |
| 2006/0007372 A1 | 1/2006 | Yuuki | |
| 2006/0044609 A1 | 3/2006 | Kato | |
| 2006/0047766 A1 | 3/2006 | Spadea | |
| 2006/0053194 A1 | 3/2006 | Schneider | |
| 2006/0075044 A1* | 4/2006 | Fox et al. | 709/206 |
| 2006/0080613 A1 | 4/2006 | Savant | |
| 2006/0089147 A1 | 4/2006 | Beaty | |
| 2006/0098992 A1 | 5/2006 | Yamazaki | |
| 2006/0117264 A1 | 6/2006 | Beaton | |
| 2006/0136498 A1 | 6/2006 | Insley | |
| 2006/0156329 A1 | 7/2006 | Treese | |
| 2006/0168056 A1 | 7/2006 | Gandhi | |
| 2006/0170705 A1 | 8/2006 | Wilson | |
| 2006/0190281 A1 | 8/2006 | Kott | |
| 2006/0200523 A1 | 9/2006 | Tokuda | |
| 2006/0237532 A1 | 10/2006 | Scott-Leikach | |
| 2006/0242139 A1 | 10/2006 | Butterfield | |
| 2006/0245555 A1 | 11/2006 | Makela | |
| 2006/0252547 A1 | 11/2006 | Mizrahi | |
| 2006/0253491 A1* | 11/2006 | Gokturk et al. | 707/104.1 |
| 2006/0256959 A1* | 11/2006 | Hymes | 379/433.04 |
| 2006/0259910 A1 | 11/2006 | Popp | |
| 2006/0265596 A1 | 11/2006 | Nagayama | |
| 2006/0269309 A1 | 11/2006 | Yamazaki | |
| 2006/0282317 A1 | 12/2006 | Rosenberg | |
| 2006/0282426 A1 | 12/2006 | Spears | |
| 2007/0005754 A1 | 1/2007 | Horvitz | |
| 2007/0011186 A1 | 1/2007 | Horner | |
| 2007/0011236 A1 | 1/2007 | Ravula | |
| 2007/0011340 A1 | 1/2007 | Seidl | |
| 2007/0022190 A1 | 1/2007 | Brasegard | |
| 2007/0027931 A1 | 2/2007 | Heckenbach | |
| 2007/0033280 A1 | 2/2007 | Popp | |
| 2007/0067271 A1 | 3/2007 | Lu | |
| 2007/0067392 A1 | 3/2007 | Torres | |
| 2007/0100939 A1 | 5/2007 | Bagley | |
| 2007/0107007 A1 | 5/2007 | Wolcott | |
| 2007/0118461 A1 | 5/2007 | Arkes | |
| 2007/0135097 A1 | 6/2007 | Rahkonen | |
| 2007/0136428 A1 | 6/2007 | Boutboul et al. | |
| 2007/0157273 A1 | 7/2007 | McIntyre | |
| 2007/0161382 A1 | 7/2007 | Melinger | |
| 2007/0162569 A1 | 7/2007 | Robinson | |
| 2007/0179792 A1 | 8/2007 | Kramer | |
| 2007/0180039 A1 | 8/2007 | Sutidze | |
| 2007/0184855 A1 | 8/2007 | Klassen | |
| 2007/0209067 A1 | 9/2007 | Fogel | |
| 2007/0219863 A1 | 9/2007 | Park | |
| 2007/0219958 A1 | 9/2007 | Park | |
| 2007/0220092 A1 | 9/2007 | Heitzeberg | |
| 2007/0233787 A1 | 10/2007 | Pagan | |
| 2007/0244749 A1 | 10/2007 | Speiser | |
| 2007/0250901 A1 | 10/2007 | McIntire | |
| 2007/0259654 A1 | 11/2007 | Oijer | |
| 2007/0264966 A1 | 11/2007 | Arai | |
| 2007/0296739 A1 | 12/2007 | Lonn | |
| 2008/0005249 A1 | 1/2008 | Hart | |
| 2008/0010139 A1 | 1/2008 | Elmer | |
| 2008/0030496 A1 | 2/2008 | Lee | |
| 2008/0033739 A1 | 2/2008 | Zuckerberg | |
| 2008/0033941 A1 | 2/2008 | Parrish | |
| 2008/0040370 A1 | 2/2008 | Bosworth | |
| 2008/0049107 A1 | 2/2008 | Hii | |
| 2008/0064374 A1 | 3/2008 | Coffing | |
| 2008/0072157 A1 | 3/2008 | Pally | |
| 2008/0077595 A1 | 3/2008 | Leebow | |
| 2008/0086703 A1 | 4/2008 | Flynt | |

(56) References Cited

U.S. PATENT DOCUMENTS

| | | |
|---|---|---|
| 2008/0091517 A1 | 4/2008 | Koonce |
| 2008/0091723 A1 | 4/2008 | Zuckerberg |
| 2008/0114737 A1 | 5/2008 | Neely et al. |
| 2008/0115149 A1 | 5/2008 | Rupp |
| 2008/0162649 A1 | 7/2008 | Lee |
| 2008/0168497 A1 | 7/2008 | Mitchem |
| 2008/0183750 A1 | 7/2008 | Lee |
| 2008/0184133 A1 | 7/2008 | Lee |
| 2008/0195664 A1 | 8/2008 | Maharajh |
| 2008/0250332 A1 | 10/2008 | Farrell |
| 2009/0018903 A1 | 1/2009 | Iyer |
| 2009/0019370 A1 | 1/2009 | Pally |
| 2009/0117883 A1 | 5/2009 | Coffing |
| 2009/0119603 A1 | 5/2009 | Stackpole |
| 2009/0186699 A9 | 7/2009 | Kelly |
| 2009/0285506 A1 | 11/2009 | Benson |
| 2009/0315991 A1 | 12/2009 | Renkis |
| 2010/0016003 A1 | 1/2010 | Shapiro |
| 2010/0031341 A1 | 2/2010 | Loh |
| 2010/0050090 A1 | 2/2010 | Leebow |
| 2010/0100943 A1 | 4/2010 | Pacholec |
| 2010/0103277 A1 | 4/2010 | Leebow |
| 2010/0223341 A1 | 9/2010 | Manolescu |
| 2010/0235285 A1* | 9/2010 | Hoffberg .................. 705/75 |
| 2010/0268783 A1 | 10/2010 | Mizosoe |
| 2011/0035680 A1 | 2/2011 | Borovoy |
| 2012/0185538 A1 | 7/2012 | Lee |

OTHER PUBLICATIONS

"JavaScript Scroller PRO—Demo #1 (Vertical Automatic Scroller)" JavaScript Scroller Pro—Demo #1 (Vertical Automatic Scrolling); Dec. 31, 2005; Web Jan. 9, 2012. <http://web.archive.org/web/20051231062850/http://www.softcomplex/products/tigra_scroller_pro/demo1.html>; 1 page.

International Search Report for PCT/US08/50146 dated May 20, 2008; 3 pages.

Lu, 'Interaction Design Principles for Interactive Television', Master's thesis, submitted to Georgia Institute of Technology, Dept. of Information Design and Technology (online), Published May, 2005, (retrieved on Jul. 3, 2008); 219 pages; retrieved from the Internet: http://dm.lcc.gatech.edu/ms_projects/klu/lu_karyn_y_200505_mast.pdf.

International Search Report for PCT/US08/52021 dated Jul. 14, 2008, 2 pages.

International Search Report for PCT/US2008/052029 dated Jul. 16, 2008, 2 pgs.

International Search Report for PCT/US08/74512 dated Jul. 6, 2009; 3 pages.

Stolowitz Ford Cowger LLP; Listing of Related Cases; Dated Apr. 2, 2013; 1 page.

* cited by examiner

IMAGE BASED ELECTRONIC MAIL SYSTEM

CROSS REFERENCE TO RELATED APPLICATION

This application is a continuation of U.S. patent application Ser. No. 11/619,520, filed on Jan. 3, 2007, which issued on Apr. 2, 2013 as U.S. Pat. No. 8,413,059 the disclosure of which is herein incorporated by reference.

BACKGROUND

Electronic mail systems provide notification of received emails and are used to compose and send emails. The user interface for email systems are text based and provide relatively primitive and non-intuitive email message notifications and navigation. For instance, email systems today provide a text listing of received emails. The text listings can include the name of the email sender, the subject of the email, and the date and time the email was sent. The graphics associated with the emails may include an envelope that indicates whether or not the email has been opened and then possibly an exclamation point or flag to identify an important email.

These email systems do not provide intuitive human identifications of the email sender. For example, the person receiving the email may not immediately recognize the sender name contained in the email message, and particular emails may not be readily identified within the morass of other received emails in the same user inbox. In these cases, certain emails might not be promptly identified, opened and read. Even worse, an important email might be perceived as junk mail and inadvertently deleted when the email sender name is not recognized. In an opposite situation, the email recipient may constantly open emails from unknown senders thinking the emails may be from an important contact with an unfamiliar name.

In yet another inconvenient situation, an email user might not remember the email address or name of a previous email sender. The user might then be forced to manually sort through hundreds of previously received emails to locate the previously received email message. Other problems also arise when sending emails to particular email addresses. The user first has to locate and extract the email address, if the address even exists, from a contacts list. Otherwise, the user has to sift through previously received email messages for the desired email address. The user then has to cut and paste the email address from the located email into a new email message. Needless to say, these tasks are time consuming and awkward.

The present invention addresses these and other problems associated with the prior art.

DRAWINGS

The foregoing and other objects, features and advantages of the invention will become more readily apparent from the following detailed description of a preferred embodiment of the invention which proceeds with reference to the accompanying drawings.

DETAILED DESCRIPTION

Inbox Default View

Figure 1:
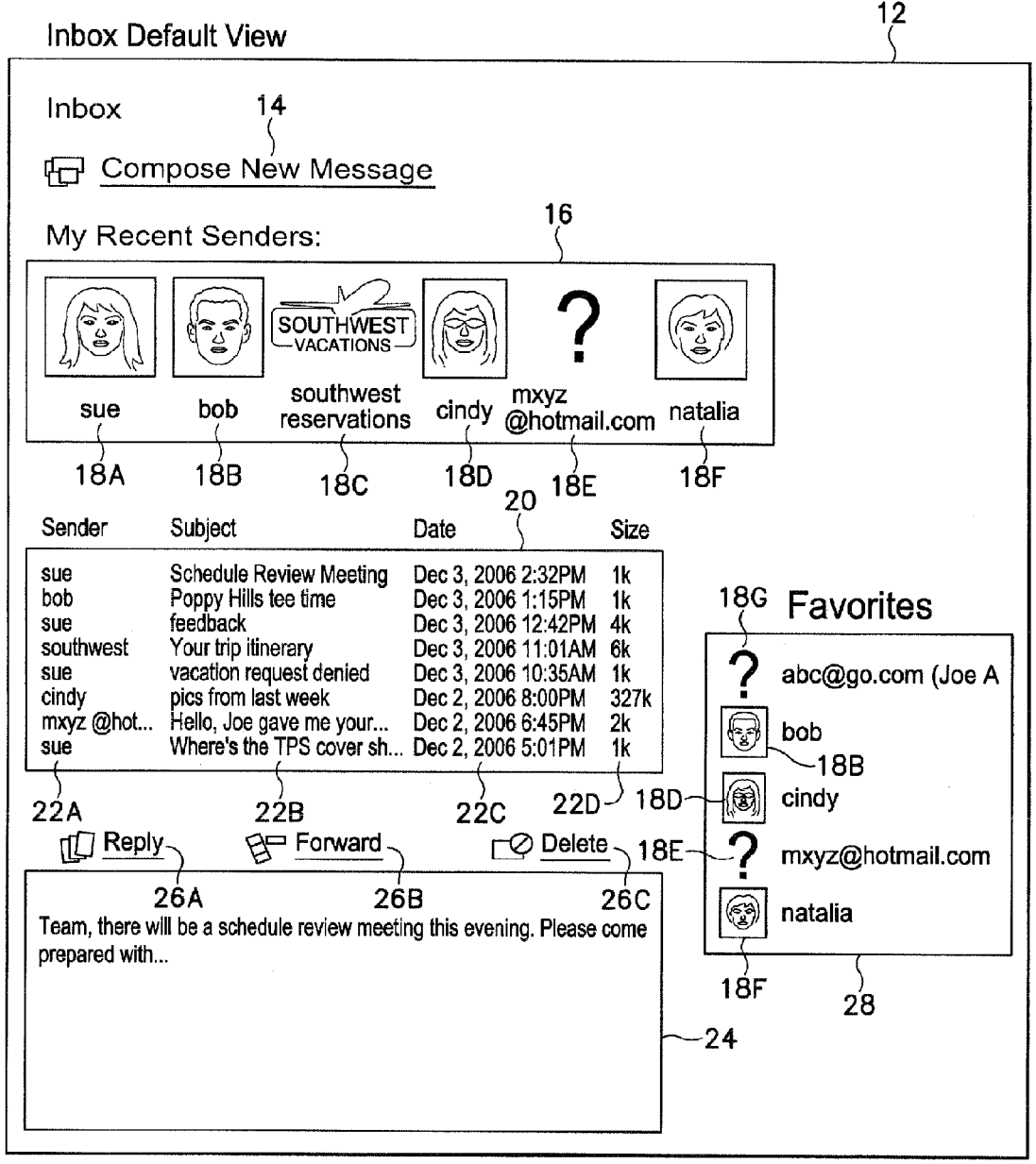
FIG. 1 is a default page for an image based email inbox.

FIG. 1 shows one example of an inbox default page 12 for an image based email system. In this example, the inbox default page 12 includes a compose new message icon 14 that when selected brings up a new page for composing a new email message. The composition page is described in more detail below.

Of particular interest in FIG. 1 is a "My Recent Senders" bar (recent sender bar) 16, scrollable message list (message list) 20, scrollable message pane 24, and scrollable favorites list 28. The recent sender bar 16 graphically displays images associated with each of the most recently received email messages. The message list 20 shows a chronologically sorted list of the mostly received emails. In this embodiment, the message list 20 shows the sender names 22A, subject lines 22B, dates 22C, and size 22D for each of the chronologically sorted emails. The different email information 22A-22D displayed in message list 20 can be changed or reconfigured.

The message pane 24 shows the body of selected email messages. In an initial default condition, the body of the most recently received email in message list 20 may be displayed in message pane 24. Otherwise, the message pane 24 shows the body of a particular selected email message. The user can reply to the displayed email in message pane 24 by selecting reply icon 26A, forward the email message by selecting forward icon 26B, and delete the displayed email by selecting delete icon 26C.

The recent sender bar 16 is populated with pictures or place holders 18A-18F representing some number of most recent unique senders to the account holder (user). The message list 20 will contain all messages in order received, usually most recent first. The message list 20 may have a somewhat different set of users than those appearing in the sender bar 16. This is due to the possibility of multiple messages from the same sender. In the description below pictures, graphics, placeholders, photographs, video clips, audio clips, or any other visual or audio information used to identify an email message sender is referred to generally as an image.

Displaying Recent Senders

Figure 2:
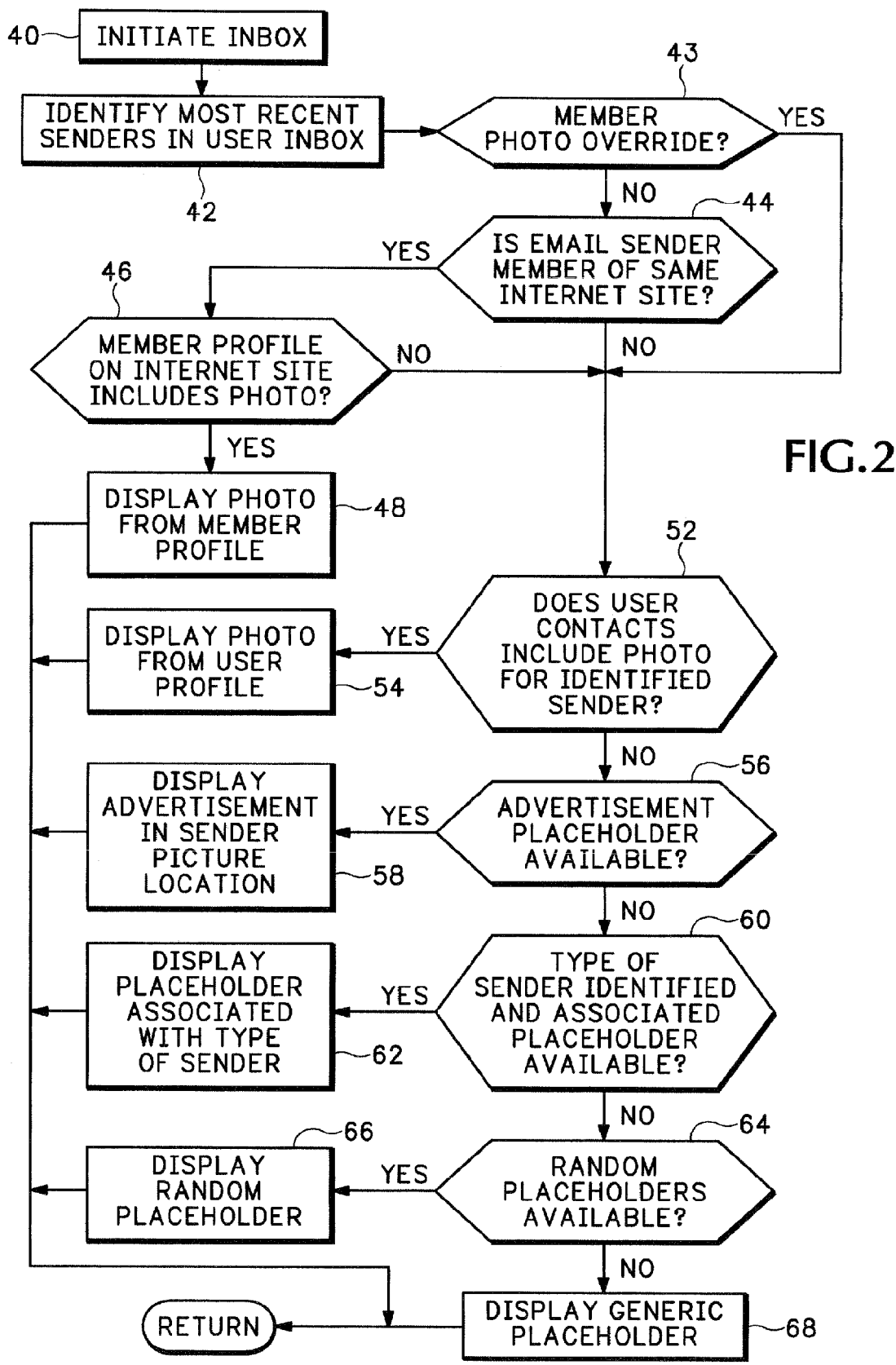
FIG. 2 is a flow diagram showing how images are displayed for received email messages.

FIG. 2 describes in more detail how the email system displays different images 18A-18F in recent sender bar 16. In operation 40, the email system is accessed and the default inbox page 12 in FIG. 1 is displayed. For example, the user may sign in to the website operating the email system by entering a user name and password. The website may then either automatically display the default inbox page 12 in FIG. 1, or may display the inbox page 12 after the user clicks on an associated link from another user home page.

The email system in operation 42 accesses an email server and automatically identifies the senders who most recently sent email messages to the user. In the example shown in FIG. 1, the email system identifies the six most recent email senders. The email system displays an image in bar 16 for each of these six identified most recent senders. Of course, this is just one example, and any number of most recent senders may be identified and displayed in bar 16. A user configuration profile may allow the user to select the number of most recent senders displayed in sender bar 16. The user might then be charged for any additional images 18 above some predetermined displayed number.

The images or placeholders 18A-18F may come from a variety of different sources and forms. A member of the same email service may upload a photo representing themselves into a website profile directory. The profile directory may also associate an email IP address with the uploaded photo. The account holder (user) of the inbox 12 may also upload photos into a contact list and associate the uploaded photos with sender email addresses. Any other desired visual data may also be associated with the email senders. For example, the website profile for different email participants may also be uploaded with a small video clip, audio clip, or other photos. The website profile may then allow the associated website member sending the email message to specify which image or audio data to attach or link to email messages.

The user receiving the email message may also configure the email system in operation 43 to select between displaying a local picture of the sender uploaded in the user contacts list or displaying a picture obtained from the sender's website profile. If a member profile picture is preferred in operation 43, the email system in operation 44 determines if any of the most recent identified senders are members of the same website. For example, the email system may compare the sender email address in the received email message with email addresses of other website members. If the sender email address matches a website member email address in operation 44, the email system in operation 46 determines if there is an associated photo, audio clip, image, graphic, etc., in the identified website member profile.

In operation 48, any image identified in the member profile is displayed as one of the images 18 in sender bar 16 of FIG. 1. In another embodiment, the member profile may identify a link to a personal website location that contains the image or audio clip for displaying in sender bar 16. Accordingly, the email system accesses or selects the link provided in the user profile and displays the information at the link location as one of the images 18 in a recent sender bar 16.

Thus, in one embodiment, the email sender has control over what photo is displayed when the email is received in inbox 12. This may be significant in that the email sender may want to frequently change the images displayed with particular email messages. In another embodiment, the email sender may also configure their website member profile to provide different images for different destination email addresses. The email system identifies the image in the member profile associated with the destination email address and attaches the identified image to the sent email message.

The email sender may not be a member of the website operating the email system in FIG. 1, or the user may choose to override any photo identified in a website member profile in operation 43. In either case, the email system in operation 52 may check the user contacts list for previously uploaded images. For example, the user may add contact information for a particular person that, in addition to including an email address, business address and various phone numbers, may also include an associated photo or other image. In operation 54, the email system checks the user contact list for an email address corresponding with the sender email address in the received email message. If a matching email address is located and the located contact includes a photo, then that photo is displayed as one of the images 18 in the recent sender bar 16.

The email system in operation 56 may also be configured to insert advertisements into the sender bar 16 either for particular sender email addresses, domain names, or generically for any sender with no associated photo. For example, a recently received email may be identified as coming from a particular airline company in operation 56. The email system in operation 58 inserts an advertisement or banner advertisement 18C (FIG. 1) that was previously provided by the airline. The banner ad 18C may be displayed in the sender bar 16 whenever one of the most recently received emails has a particular airline email address or domain name. The banner ad 18C could alternatively be a special offer, such as displaying a discount ticket that may be valid for some specified period of time.

The email system could also be configured to display different business banner ads for different types of received emails. For example, a travel agent could pay to have their contact information displayed whenever an email is received having an airline domain name. Other advertisements may be used as generic placeholders for any recently received emails that do not have an associated photo either in the website member profile, or in the user local contacts. For example, a shoe manufacturer may pay to have their logo displayed as one of the images 18 in sender bar 16 for any non-airline emails that have no other associated images.

The mail system in operation 60 may be configured to display other place holders in sender bar 16 for other known or unknown email senders. For example, an email sent within the same day or within the same hour may be displayed with a first type of place holder and emails received longer than one hour or one day ago may be switched to another place holder.

In yet another embodiment, the email system may display a first placeholder for known senders with no associated photo and display a second placeholder for unknown senders. For example, a first recent sender may have a corresponding email address in the user contacts list or in one of the website member profiles. Accordingly, the email system may display a first place holder in sender bar 16 that indicates a known sender. Otherwise the email system displays a second type of placeholder, such as the question mark image 18E shown in FIG. 1.

The email system in operation 64 may also determine if random placeholders are available and display a different random placeholder or advertisement in operation 66 for different unknown senders. In another embodiment, the email system may have a default set of photos that are randomly assigned to different email senders that do not have photos available on the website member profiles or in the user contact list. This allows the user to further differentiate between two different unknown senders. Finally, with no other configurations, the email system in operation 68 may simply display a generic placeholder, such as the question mark image 18E shown in FIG. 1, for senders with no associated photo.

In one embodiment, known senders with associated photos may be displayed first in sender bar 16 and then other unknown senders and advertisements may be displayed on the right side of the sender bar 16 after the known senders.

Inbox Sender Selected

Figure 3:
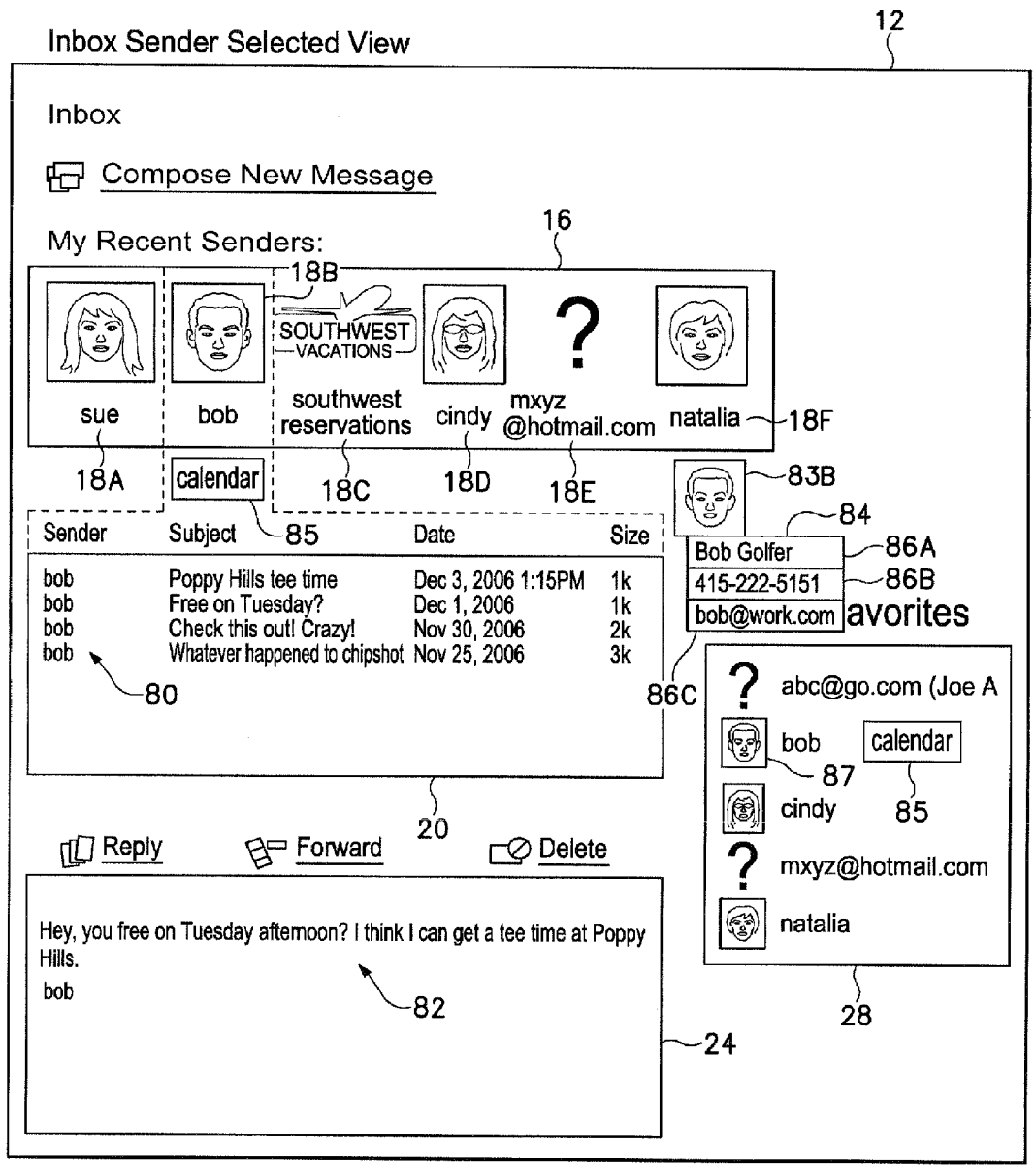
FIG. 3 shows the inbox page when one of the images in the recent sender bar is selected.

Referring to FIG. 3, an email sender is selected by the user clicking on one of the images 18A-18F in sender bar 16. In this example, the user clicks on the image 18B for the email sender BOB. Now referring to FIGS. 3 and 4, the email system in operation 90 in FIG. 4 detects selection of the image 18B in sender bar 16. In one embodiment, the selected photo 18B, as well as the message list 20, may be highlighted or outlined to provide further confirmation that image 18B was selected.

Figure 4:
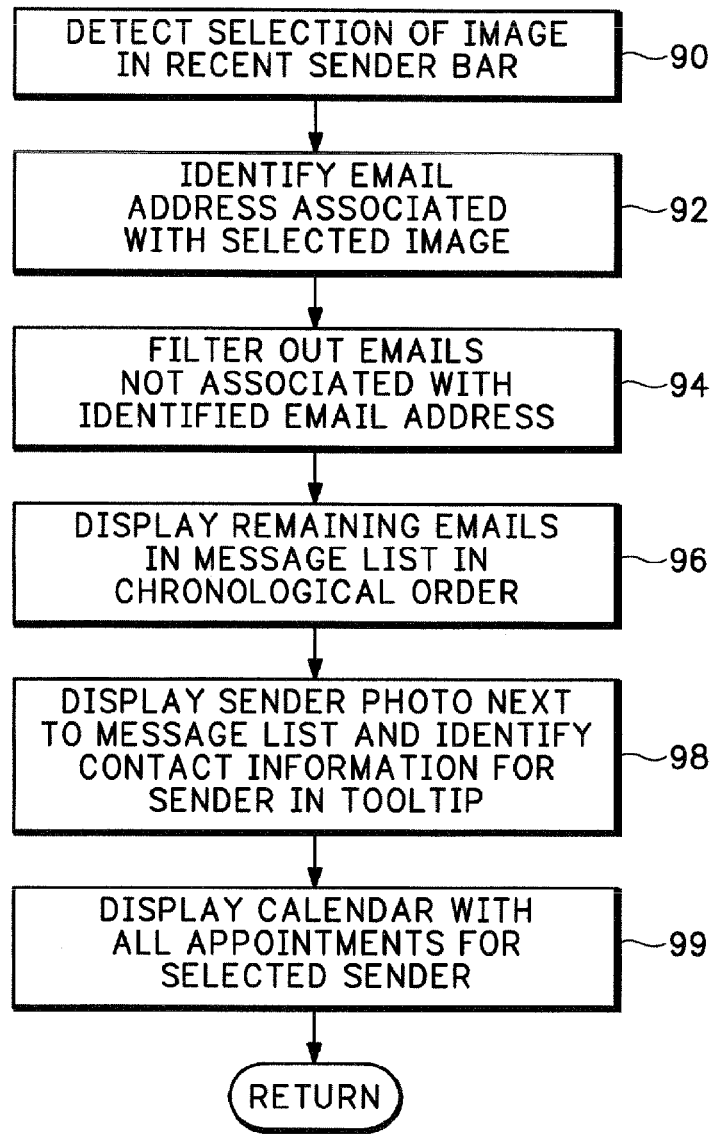
FIG. 4 is a flow diagram showing some of the operations performed by the email system after the image in the recent sender bar is selected.

In operation 92 of FIG. 4, the email system identifies the email address associated with the selected image 18B. For example, each displayed image 18A-18F may be linked to an associated sender email address. In operation 94, the email system automatically filters out all of the received emails that do not correspond with the email address associated with image 18B. Operation 96 displays the remaining non-filtered emails 80 in message list 20. In one embodiment, the remaining emails 80 are displayed in chronological order. The message pane 24 may then automatically display the body of the most recently received email message from the sender associated with photo 18B.

In operation 98, a same second photo 83B for the selected sender is displayed next to the message list 20. If the user moves the cursor over the first photo 83 or the second photo 83B, a tooltip 84 is displayed that shows contact information 86 for BOB. For example, the contact information may include a name 86A, phone number 86B and email address 86C. If the sender associated with image 18B is a member of the same website, then the email system automatically extract some of the information 86 from an associated website member profile. The same or additional information, such as the phone number 86B, may also be obtained from user contacts.

In operation 99, the email system may optionally display a calendar 85 (FIG. 3) that only contains appointments associated with the selected sender. For example, the email system may search through all appointments in a user calendar that may include the email address, name, phone number, etc., associated with sender 18B. When the user selects calendar icon 85, all of the appointments with email sender 18B are displayed. The same calendar 85 could also be persistently displayed adjacent to the photo 87 of sender BOB in the favorites list 28.

New Sender

Figure 5:
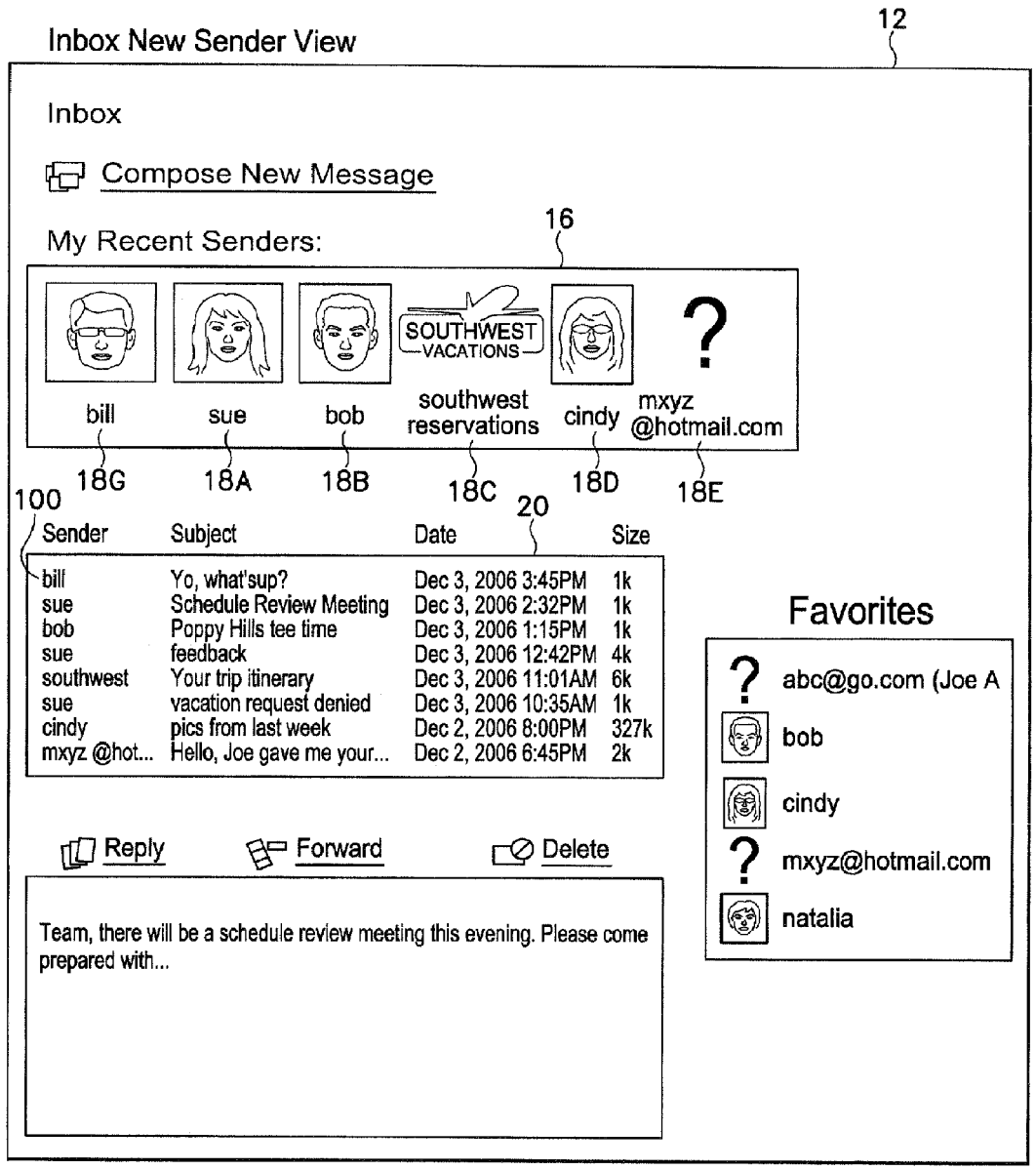
FIG. 5 shows the recent sender bar when an email message is received from a new sender.
Figure 6:
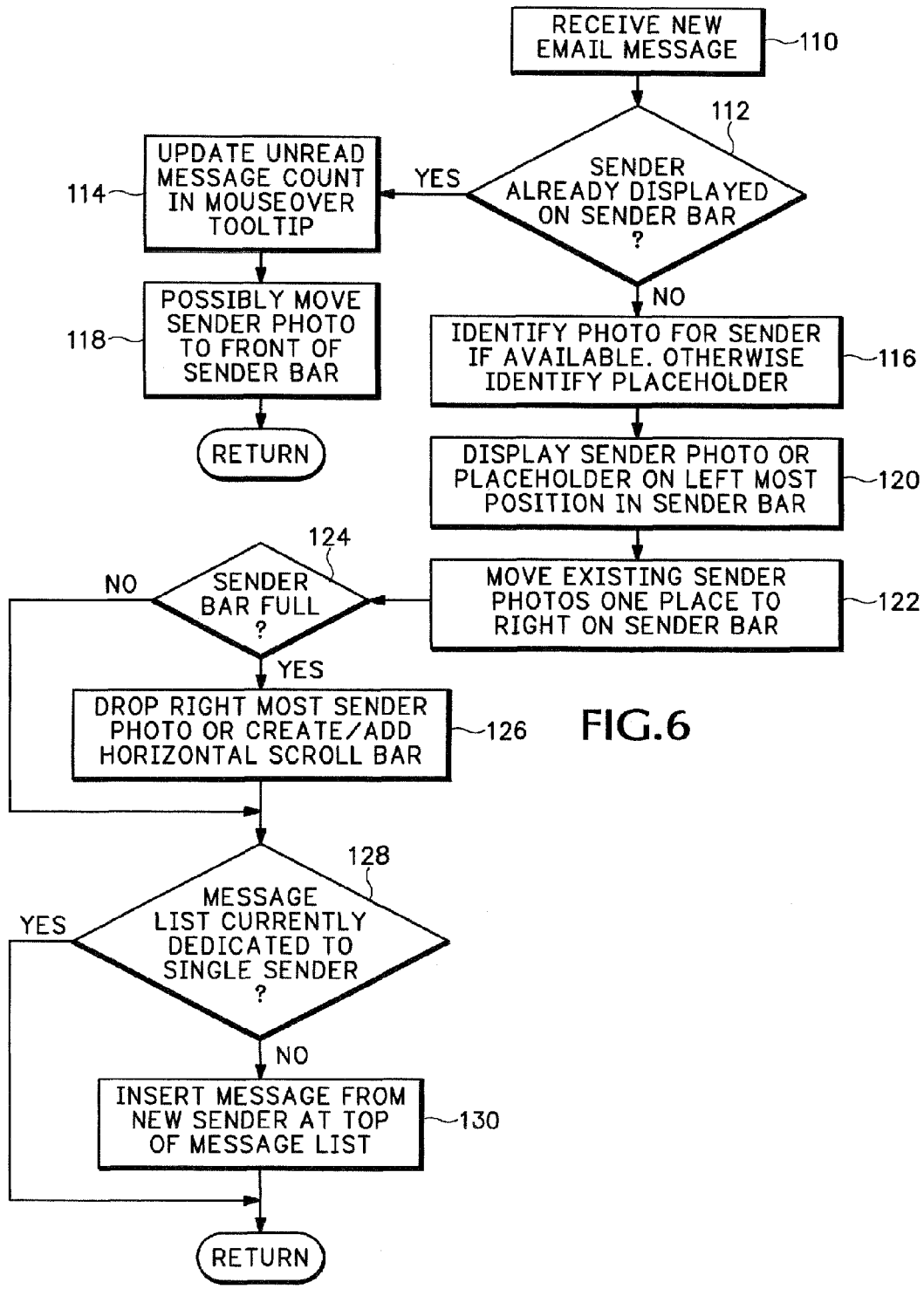
FIG. 6 is a flow diagram showing some more email system operations related to the inbox page in FIG. 5.

FIGS. 5 and 6 describe the operations performed by the email system when a new email is received. A new email message 100 (FIG. 5) may arrive from a sender in operation 110 (FIG. 6). The email system determines if the sender already has a photo displayed in the sender bar 16 in operation 112. If the new sender is already displayed in sender bar 16, then an unread message count for the sender is incremented in operation 114. If not already located at the left most position, the email system in operation 118 may move the currently displayed picture for the most recent sender to the left most position in sender bar 16. All of the other pictures 18 previously to the left of the sender picture are moved one location to the right, filling in the open space where the sender previously resided in the sender bar 16.

When the sender does not already have a picture currently displayed in the sender bar 16, the associated photo 18G or appropriate placeholder is identified for the sender in operation 116. The identified image or placeholder 18G associated with the sender is then displayed at the left end of the sender bar 16 in operation 120. The other photos or placeholders 18A-18F are moved one place to the right in operation 122. If the sender bar 16 is currently full in operation 124 (see FIG. 3), then the photo 18F for the rightmost user is removed from the sender bar in operation 126. Alternatively, a horizontal scrollbar may be added to the sender bar 16 in operation 126.

If the message list 20 in operation 128 is not currently dedicated to a single sender as shown in FIG. 3, then the new message 100 is inserted at the top of the message list in operation 130. Otherwise the current message list is not changed.

It should be noted that the images 18 in recent sender bar 16 can be displayed in any type of horizontal, circular, vertical, diagonal, etc., arrangement. For example, the picture for the most recent sender could be displayed at the far right of sender bar 16. In another example, the images 18 may be displayed vertically with the picture of the most recent sender located at the top of the vertical bar. Alternatively, four images could be arranged in a square with the picture of the most recent sender located at the upper left hand corner of the square. Any other image arrangements or groupings, such as a circle, could alternatively be used.

Unknown Sender Tooltips

Figure 7:
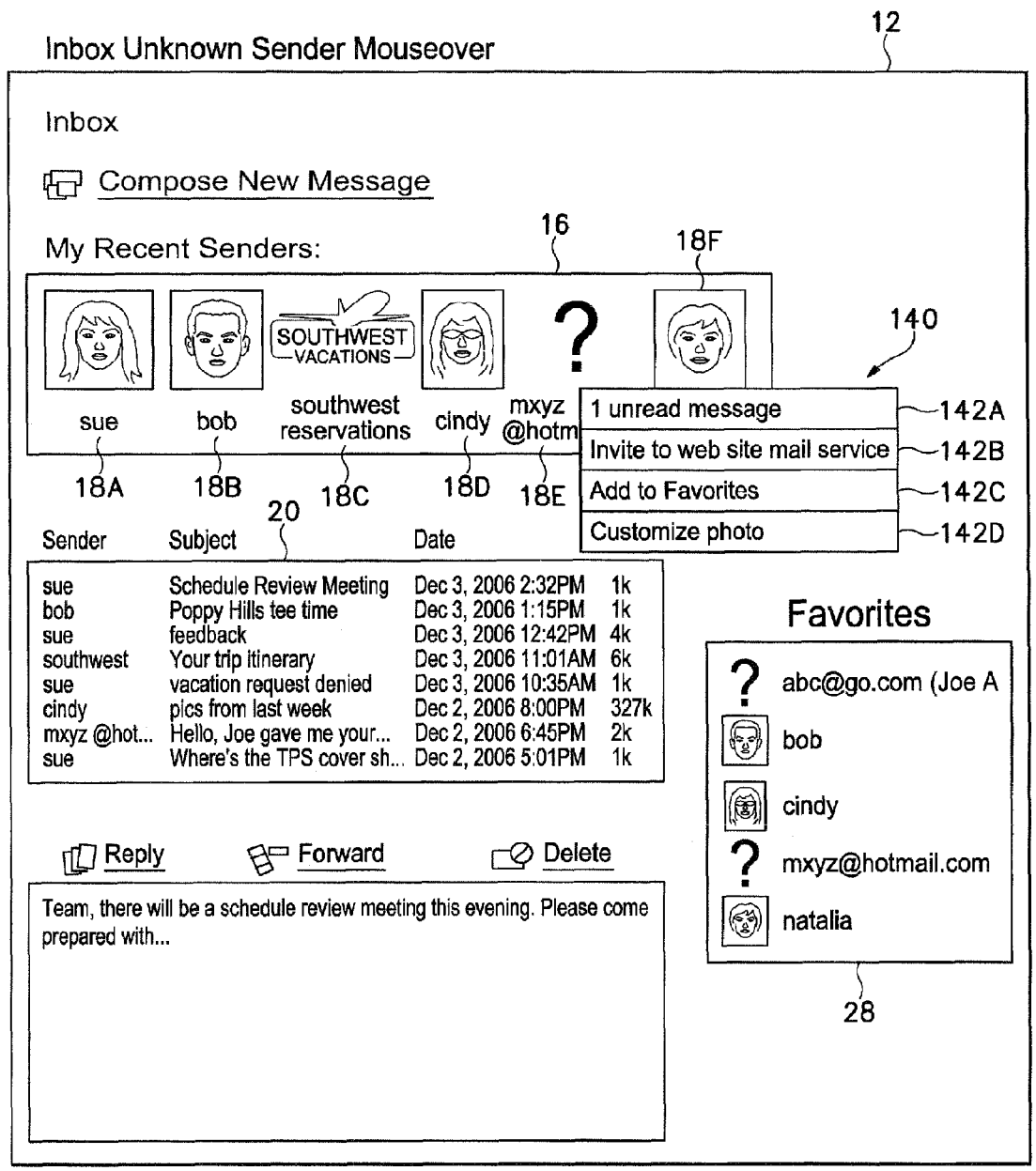
FIG. 7 shows how a tooltip is displayed for an unknown sender.
Figure 8:
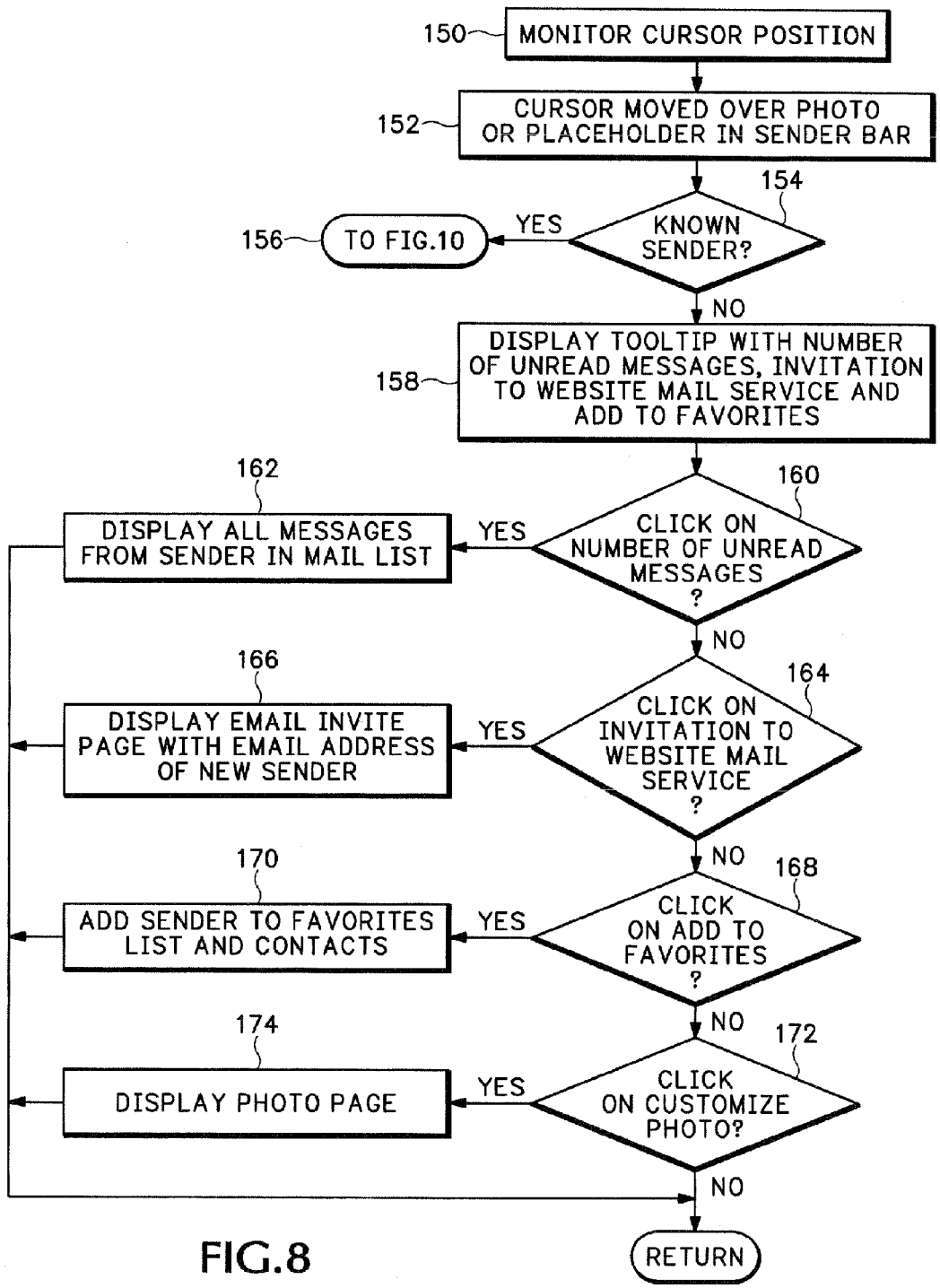
FIG. 8 is a flow diagram showing some of the operations related to the inbox page in FIG. 7.

FIGS. 7 and 8 describe how the email system operates when a cursor hovers over an unknown image in the recent sender bar 16 (mouseover). The email system monitors the cursor position in operation 150. The cursor may be detected hovering over a photo or placeholder for some predetermined period of time in operation 152. The email system then determines if the photo or place holder is a known or unknown sender in operation 154. A known sender, for example, may have information available either in the local user contact list or in a website member profile.

For a known sender, the email system operates as described below in FIGS. 9 and 10. For an unknown sender, a tooltip 140 is displayed in operation 158. In this example, the cursor is hovered over an unknown sender associated with placeholder 18E. The tooltip 140 can display a number of unread emails box 142A, an invitation to the website email service box 142B, an add to favorites box 142C box, and a customize photo box 142D. Of course, other boxes and operations could also be included in tooltip 140.

If box 142A is clicked in operation 160, then the email system in operation 162 displays all of the messages from the sender in the message list 20. This has the same effect as clicking directly on the placeholder 18E as described above in FIG. 3. If box 142B is clicked in operation 164, the user is taken to a website email service invitation page populated with the email address of the sender associated with placeholder 18E. The user can add a message and then send the invitation to the unknown sender.

If box 142C is clicked in operation 168, the picture or placeholder 18E for the unknown sender is added to the favorites list 28 and any obtainable information for the unknown sender may be added to the user contacts. This operation is described in more detail below. If box 142D is clicked in operation 172, the email system displays a web page in operation 174 for adding, modifying, or customizing the current placeholder or photo 118E.

Known Sender Tooltips

Figure 9:
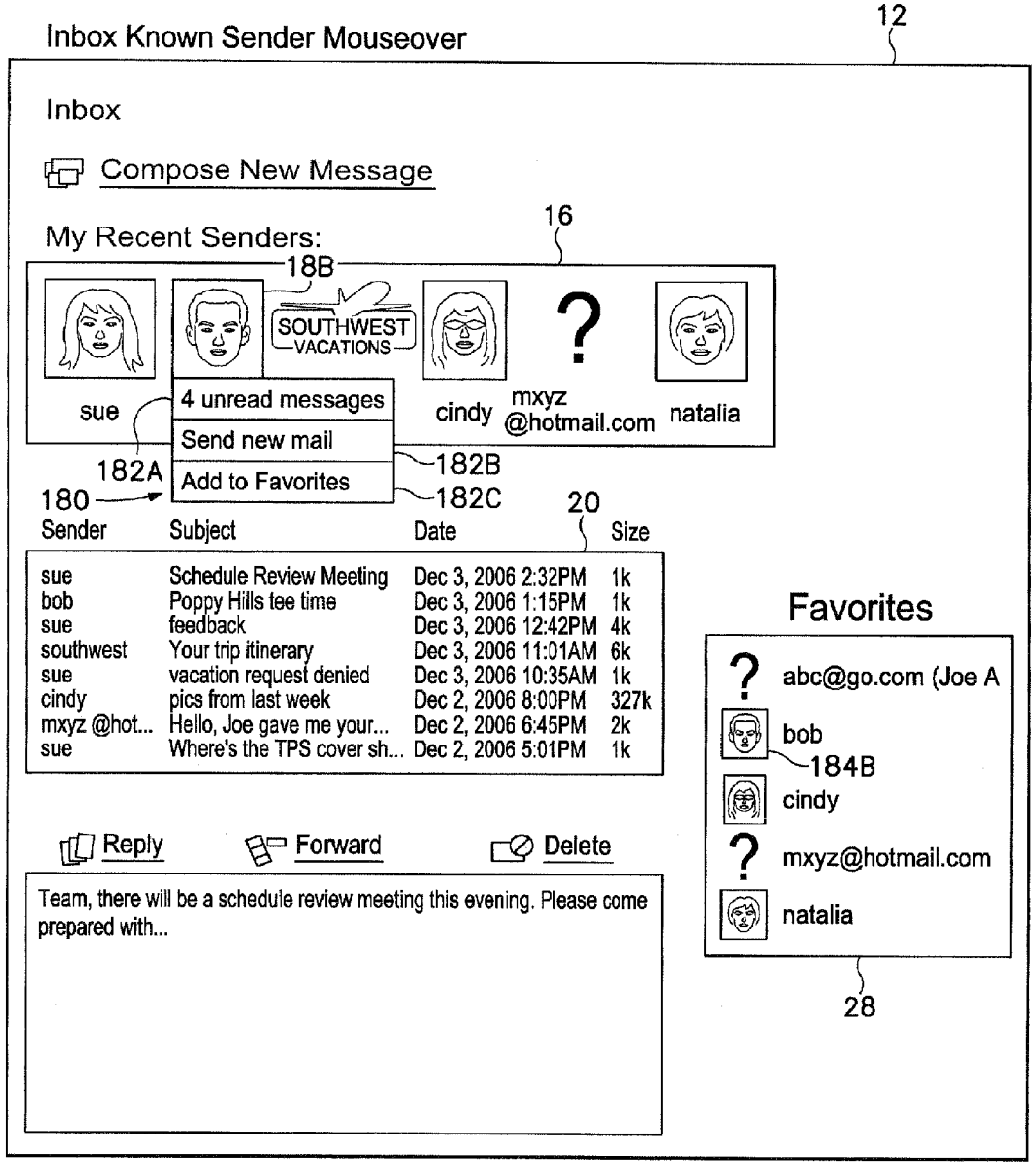
FIG. 9 shows how a tooltip is displayed for a known sender.
Figure 10:
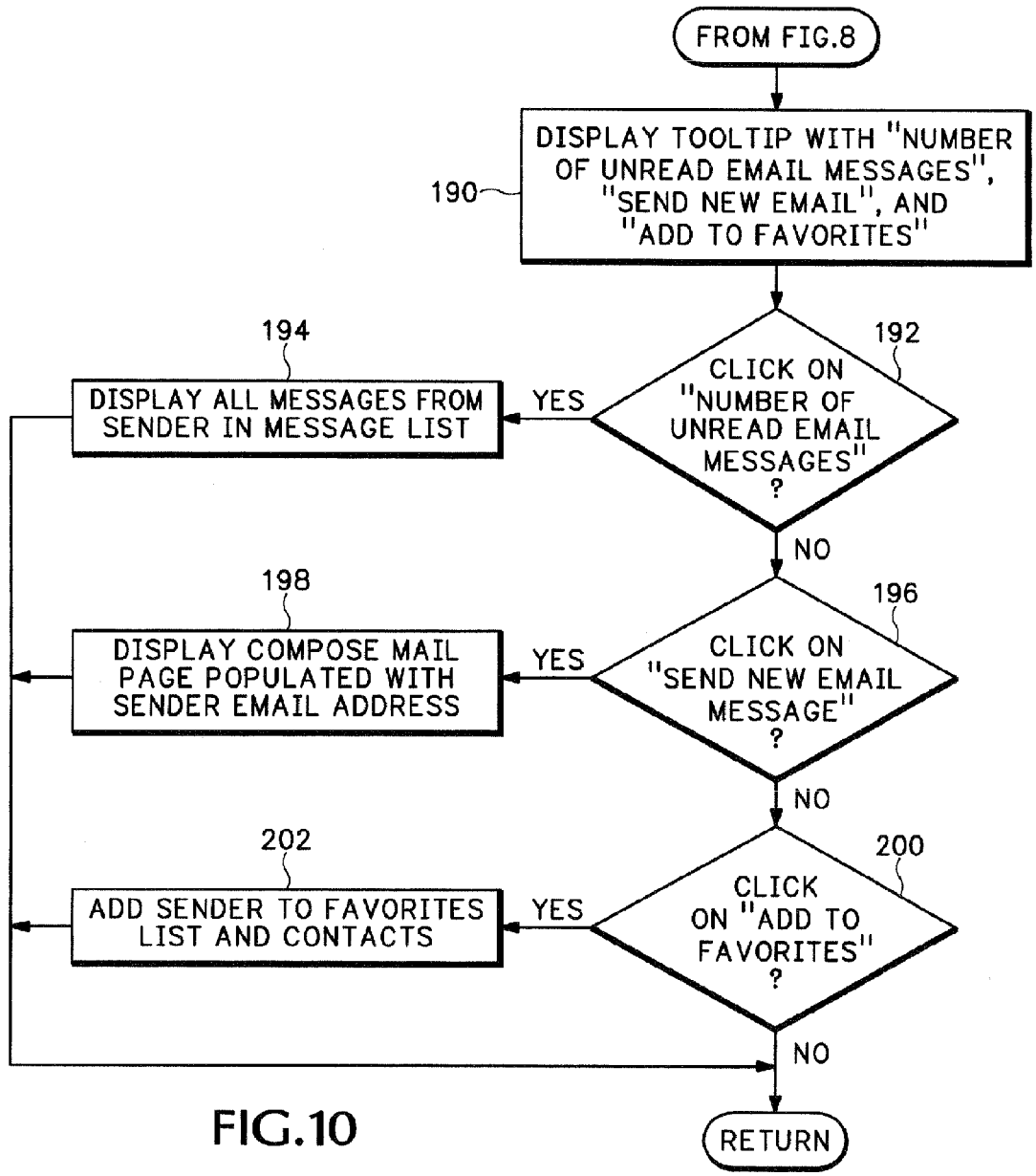
FIG. 10 is a flow diagram showing some of the operations related to the inbox page in FIG. 9.

FIGS. 9 and 10 describe how the email system operates when the cursor is hovered over the image 18B of a known sender. In operation 190 of FIG. 10, tooltip 180 is displayed and includes an unread messages box 182A, a send new mail box 182B, and an add to favorites box 182C.

When box 182A is clicked in operation 192, all of the messages from the email sender associated with photo 18B are displayed in message list 20. Again, clicking on box 182A may have the same effect as clicking on photo 18B. When box 182B is clicked in operation 196, a compose mail page is displayed in operation 198 for composing a new email to the sender. The "TO:" field in the composition page may automatically be populated with the sender email address. One example of a composition page is shown below in FIG. 12. When box 182C is clicked in operation 200, a similar picture 184B for the associated email sender is added to the favorites list 28 in operation 202 and the sender information added to the user contact list, if it does not already exist.

Favorites List

Figure 11:
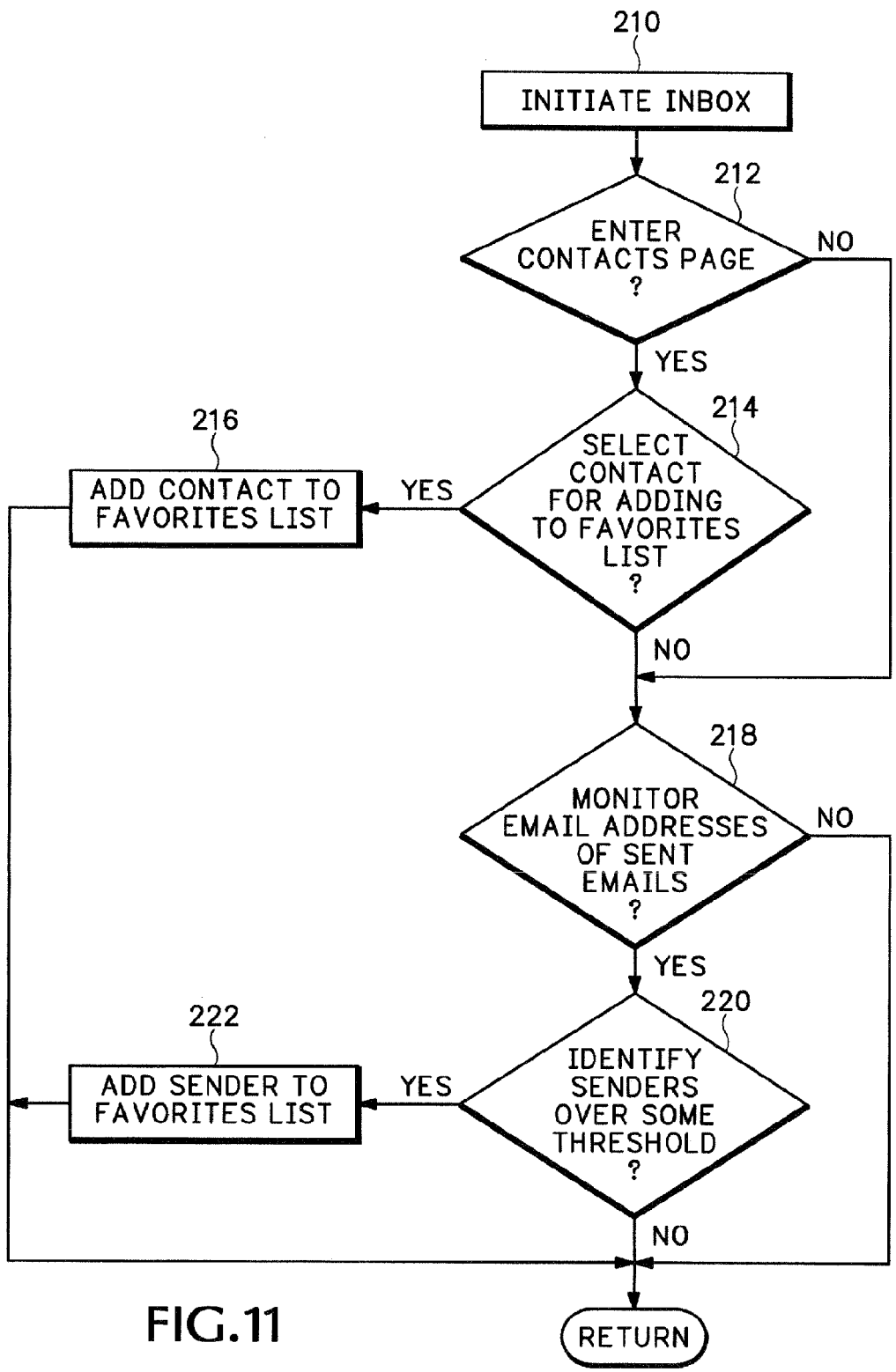
FIG. 11 is a flow diagram showing how senders are added to a favorites list.

FIG. 11 describes in more detail the favorites list 28 shown in any of the previously figures. The favorites list 28 in FIG. 9 may appear on all or most of the email pages. The senders associated with the favorites list 28 are a subset of the user contacts and can be selected in a variety of different ways, such as manually by the user or automatically by the email system.

Referring to FIG. 11, in operation 210 the email inbox page is initiated. The user may enter their contact directory in operation 212 and select one of the contacts for adding to the favorites list 28 in operation 214. The selected contact is then added to the favorites list 28 in operation 216 and any image uploaded for the selected contact is displayed in the favorites list 28.

The user may also add a sender to the favorites list 28 by manually dragging one of the images 18 in the recent senders bar 16 into the favorites list 28.

Alternatively, the email system in operation 218 may automatically monitor the email addresses of received emails. A sender may be automatically added to the favorites list 28 in operation 222 when email messages with a same associated email address has been received more than some threshold number of times in operation 220 within some predetermined time period. Any picture associated with the identified sender is then automatically displayed in the favorites list 28. A placeholder may be displayed, if a photo is not available.

In another embodiment, the email system could automatically add and delete senders from the favorites list 28, according to frequency. For example, any sender in favorites list 28 not sending an email message within some predetermined time period may be automatically removed.

Composing Emails

Novel Email composition features can also be incorporated with the image based email system described above. In addition, sending and receiving emails with this email system can be used in conjunction with a social interactive website that is described in co-pending patent application Ser. No. 11/627.326, entitled "APPARATUS FOR INCREASING SOCIAL INTERACTION OVER AN ELECTRONIC NETWORK", which is herein incorporated by reference.

Figure 12:
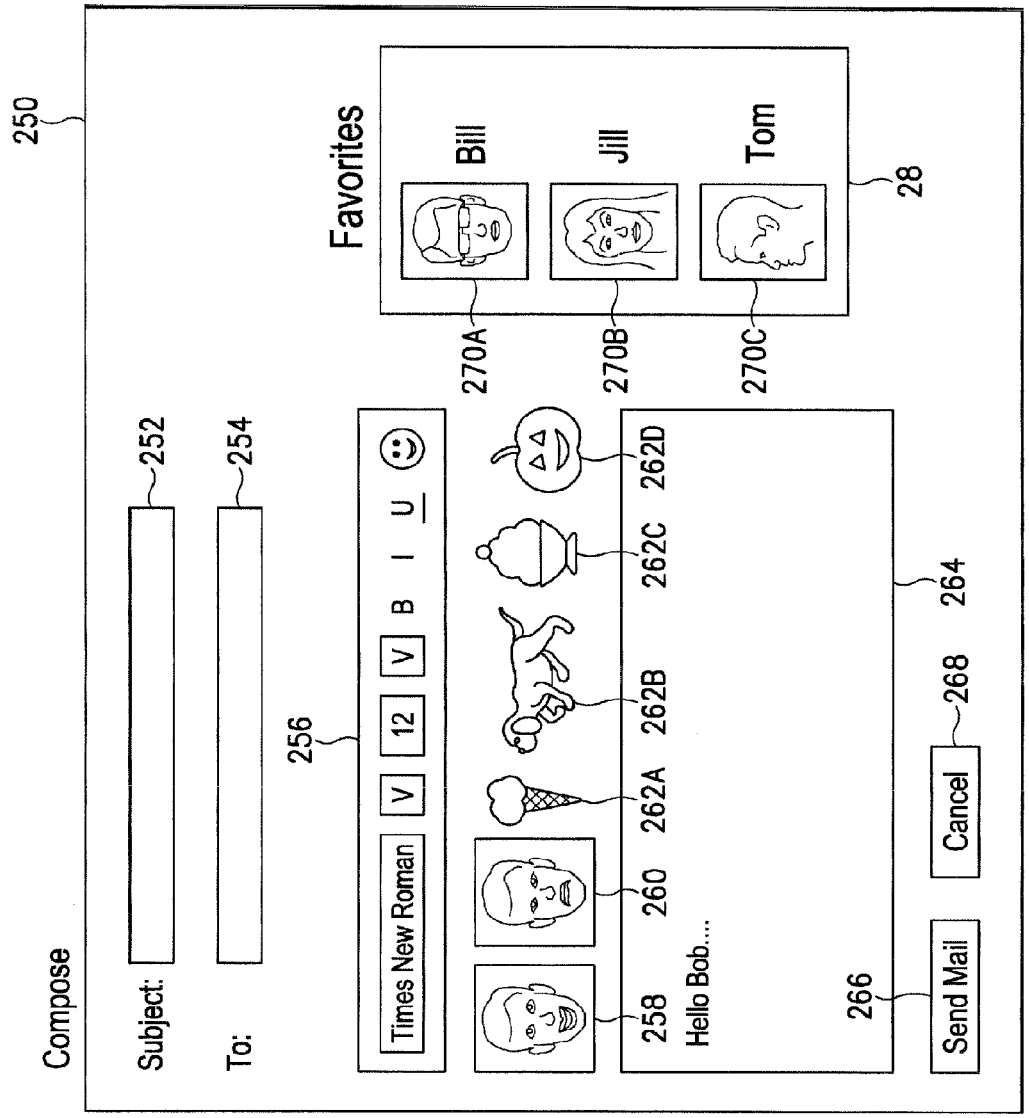
FIG. 12 shows a composition page for one embodiment of the email system.

Referring to FIG. 12, a sample composition page 250 is displayed that includes a SUBJECT field 252 for identifying the subject line for a new email message and a TO field 254 for identifying the destination email address for the email message. The composition page 250 can be accessed through a variety of ways in the email system, such as by clicking on the compose new message link 14 or reply link 26A previously shown in FIG. 1.

The compose page 250 includes a toolbar 256 for modifying the format of the email message. The compose page 250 also includes a composition window 264 for typing in the body of the new email message, a send mail icon 266 for sending the email message to the email address entered in field 254, and a cancel icon 268 for canceling the email composition session.

The user clicks on any of the photos or images 270A-270C in their favorites list 28. The email address for that selected image is then automatically loaded into field 254. If the user selects one of the images in favorites list 28 while composing an email message to another destination, then the email system may create a second composition page 250 that contains the email address associated with the recently selected image 270A-270C.

Attaching Images to Emails

Also of interest is a set of images 258 and 260 that may be associated with the user creating the email message. The user may upload several different photos or other images into their associated profile. The email system may then automatically identify and display all of the uploaded images 258 and 260 whenever the user enters composition page 250. The user can then click or drag any of the displayed images 258 or 260 into the message box 24 to attach the selected image to the composed email message.

This allows quick attachment of particular images to email messages and further allows the user to visually represent "their mood" while composing the email message. For example, a first photo 258 of the user has a relatively upbeat expression. Conversely, the second photo 260 of the same user with an unpleasant or angry expression.

The user can quickly select whichever of the photos 258 or 260 most closely represents the user's current mood. If the user is currently angry and wishes to relay that mood or feeling to the email recipient, then photo 260 is selected. On the other hand, if the user is currently in a neutral or relatively happy mood, photo 258 may be selected. The email system then attaches the selected photo 258 or 260 to the composed email message.

The email system may also attach a flag or other identifier to the selected photo. The recipient's email system receives the email message and may then automatically search for any tag or other identifier for the attached image 258 or 260. When the identifier is located, the recipient's email system then displays the attached image in the recent sender bar 16. This is described and shown in more detail below.

Awarding Points

The user may also select different objects 262A-262D for attaching to the composed email. These objects 262 are alternatively referred to as "virtual gifts". The virtual gifts are associated with a point system that is used by a social website as described in the co-pending patent application, Ser. No. 11/627.326, entitled "APPARATUS FOR INCREASING SOCIAL INTERACTION OVER AN ELECTRONIC NETWORK", which has been already been incorporated by reference.

The social website awards points for performing different website activities. For example, the user may be awarded points for sending email messages or otherwise communicating with other website members. The user may also be awarded points from member ratings of personal website photos. Uploading interesting photos on the user's personal webpage may result in higher ratings by other website members and result in the user being awarded more points.

These accumulated points can then be used for acquiring the virtual gifts 262. For example, the ice cream cone 262A may have an associated value of 20 points or "virtual bucks" and the dog 262B may have an associated value of 50 points or virtual bucks. The user composing the email message clicks or drags any of the virtual gifts 262 into the message box 264. The image for the selected virtual gift 262 is then attached and sent along with the email message to the destination address.

Figure 13:
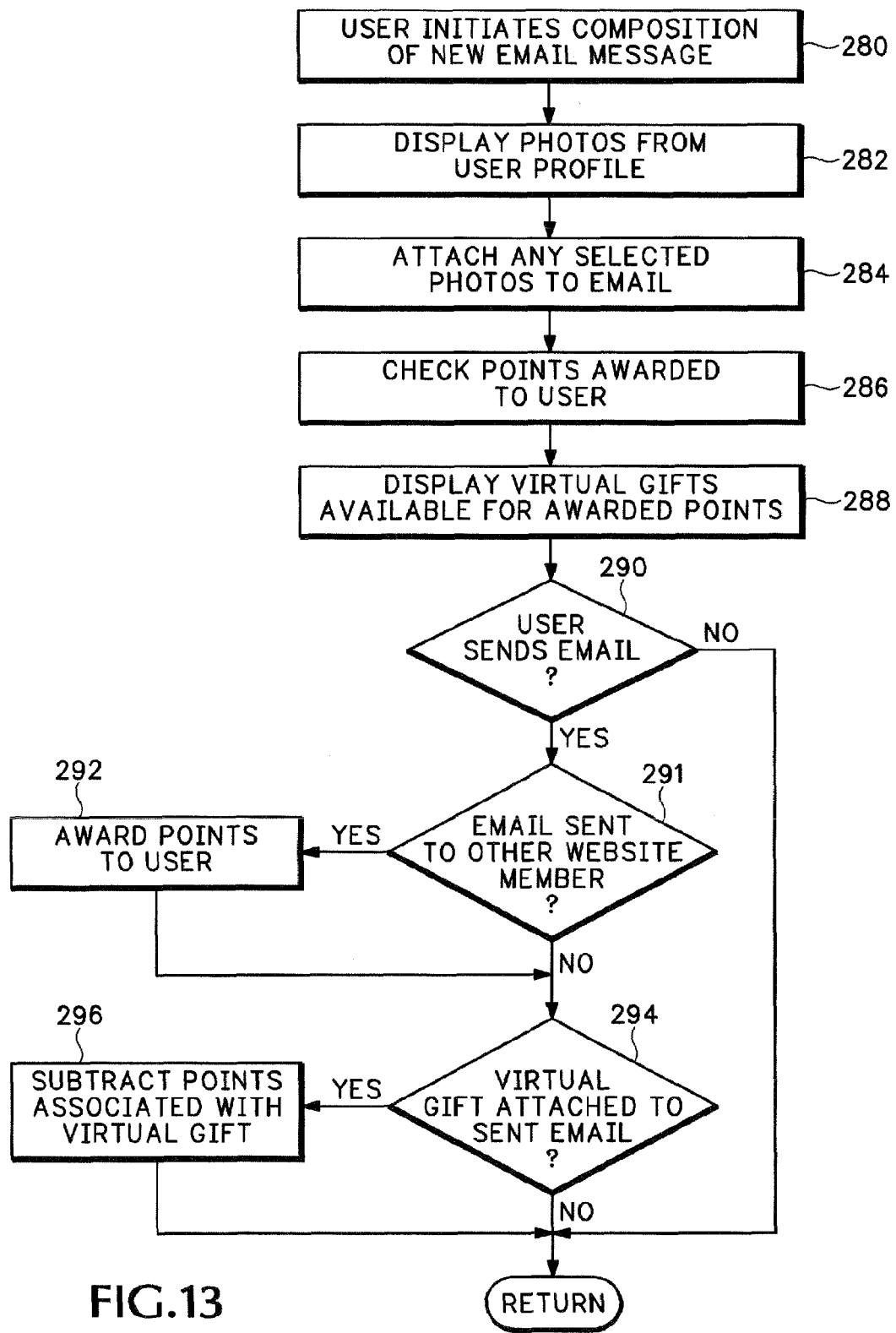
FIG. 13 is a flow diagram showing some of the operations related to the composition page in FIG. 12.

FIG. 13 explains in more detail some of the operations that may be performed by the email system during composition of an email. In operation 280, a user opens the composition page 250 (FIG. 12) for creating a new email message. The email system in operation 282 searches through the user profile and displays any previously uploaded photos or other images, such as images 258 and 260 in FIG. 12. The email system then attaches any of the images selected by the user to the composed email message in operation 284.

When the email system is associated with a website having an interactive point system, then operation 286 checks the user profile for the amount of currently accumulated points. As described above, the user may have accumulated points by performing certain social interactions on the associated website. In operation 288, virtual gifts 262 are displayed according to the amount of previously accumulated points. For example, if the user only has 100 accumulated points, then only the virtual gifts 262 having a virtual value of 100 points or less are displayed.

In operation 290, the email system determines when the user sends the email message. In one embodiment, the user may be awarded additional points simply by sending emails to other website members. In this case, the email system in operation 291 checks the destination address for the email message. If the email address matches the email address of another website member, then the user is awarded points in operation 292.

The email system in operation 294 may also determine if the sent email message includes one or more of the virtual gifts 262 in FIG. 12. If so, the number of points associated with the virtual gift is subtracted from the currently accumulated points for the user in operation 296.

Extracting Information from Email Messages

Figure 14:
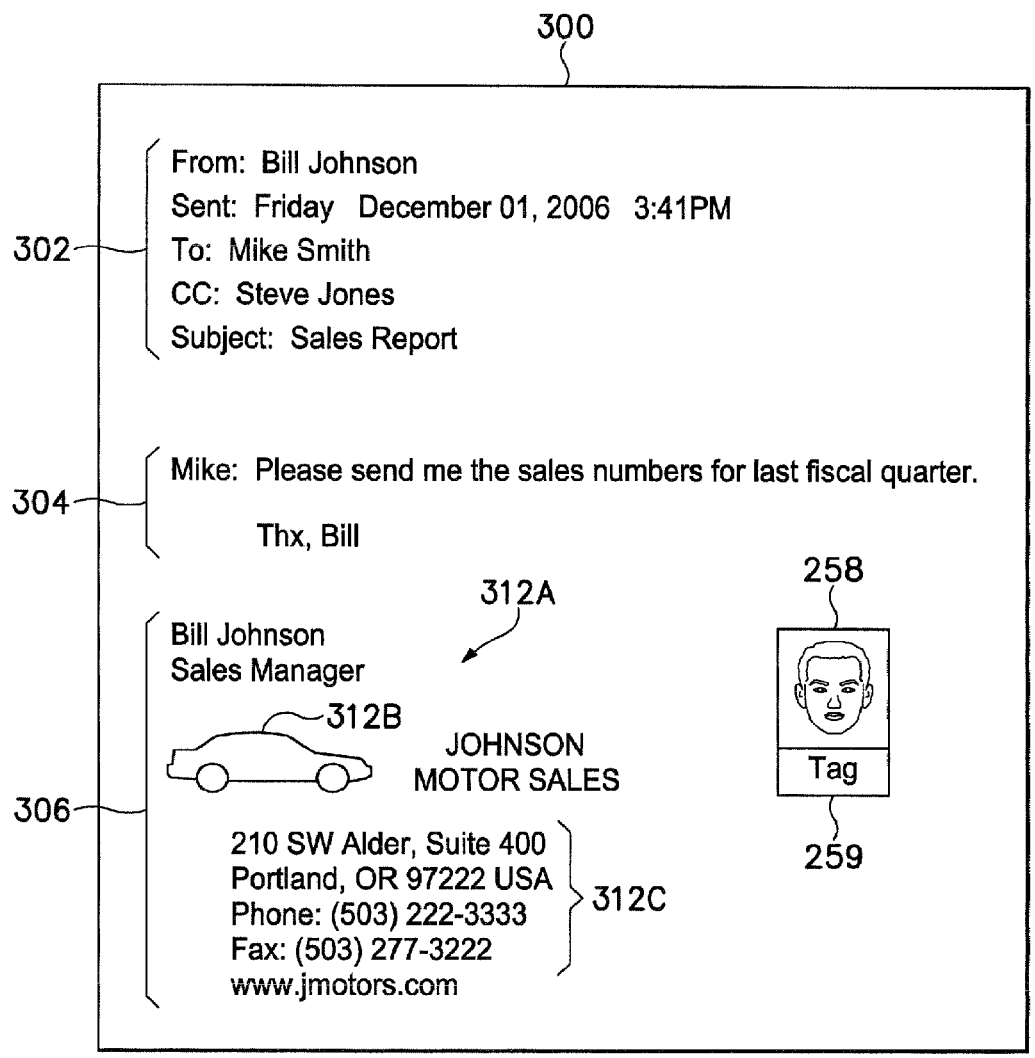
FIG. 14 shows an email message with contact and photo information.

FIG. 14 shows an email message 300 that includes header section 302 and an email message body 304. In addition, the email message 300 includes contact section 306 that often is automatically attached to each email message sent by a particular user. The header section 302 contains conventional information normally contained in most email messages that identifies the email sender, the time the email was sent, the email recipient, copied email recipients, and a subject line for the email message. The contact section 306 may contain a title 312A for the email user, and in some configurations, may also include some sort of image or logo 312AB. The contact section 306 also often includes address, phone, and email information 312C for the particular email sender.

The email message 300 may also include an image or photo 258 that the user previously selected while in the composition page 250 in FIG. 12. As described above, the image or photo 258 may also include a tag 259 that identifies the image 258 to the recipient's email system. Any image 258 identified by the recipient's email system can be displayed in the recent sender bar 16 (FIG. 1) and the image 258 and contact information 306 can also be automatically added to the user contacts. In another embodiment, the logo 312B is displayed in the recent sender bar 16, if no other image is available either in a website member profile, user contact list, or attached to the body of the email message 300.

As shown above in FIG. 12, the email composer can customize each email message 300 with a different associated image 258 or 260. This is powerful to further dramatize "the tone" of the email message 300. Currently, symbolic text characters are used in email messages to indicate the mood of the email sender. For example, an email sender may use the characters ":)" to indicate either a joking or happy mood with respect to the subject matter of the email message. Conversely, the email sender may use the characters ": (" to indicate dissatisfaction or anger with respect to the subject matter of the email message.

One problem with the present technique is that the human face can provide thousands of different expressions each associated with a different human disposition. Text characters may not accurately capture the different moods or feelings of the email sender. Another problem is that the email recipient can not determine the mood of the email sender as represented by these characters without first opening and reading the body of the email message One embodiment of the image based email system solves these problems by automatically extracting the photo or alternative image 258 from the body of the email message 300 and then displaying the extracted image 258 in the recent sender bar 16. This provides immediate notification to the email recipient of the email sender's mood.

Figure 15:
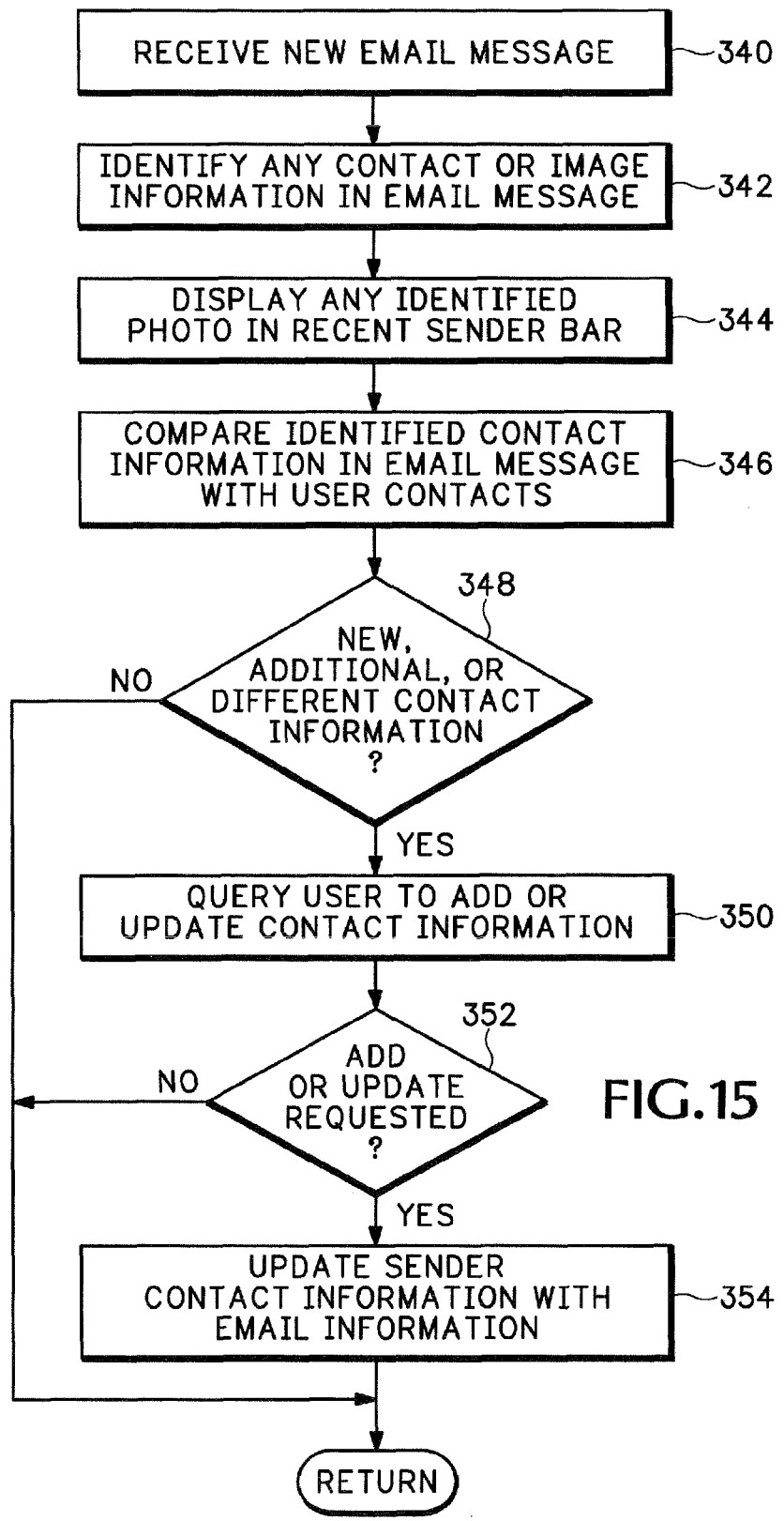
FIG. 15 is a flow diagram that explains how the email system may use the contact and photo information in the email message of FIG. 14.
Figure 16:
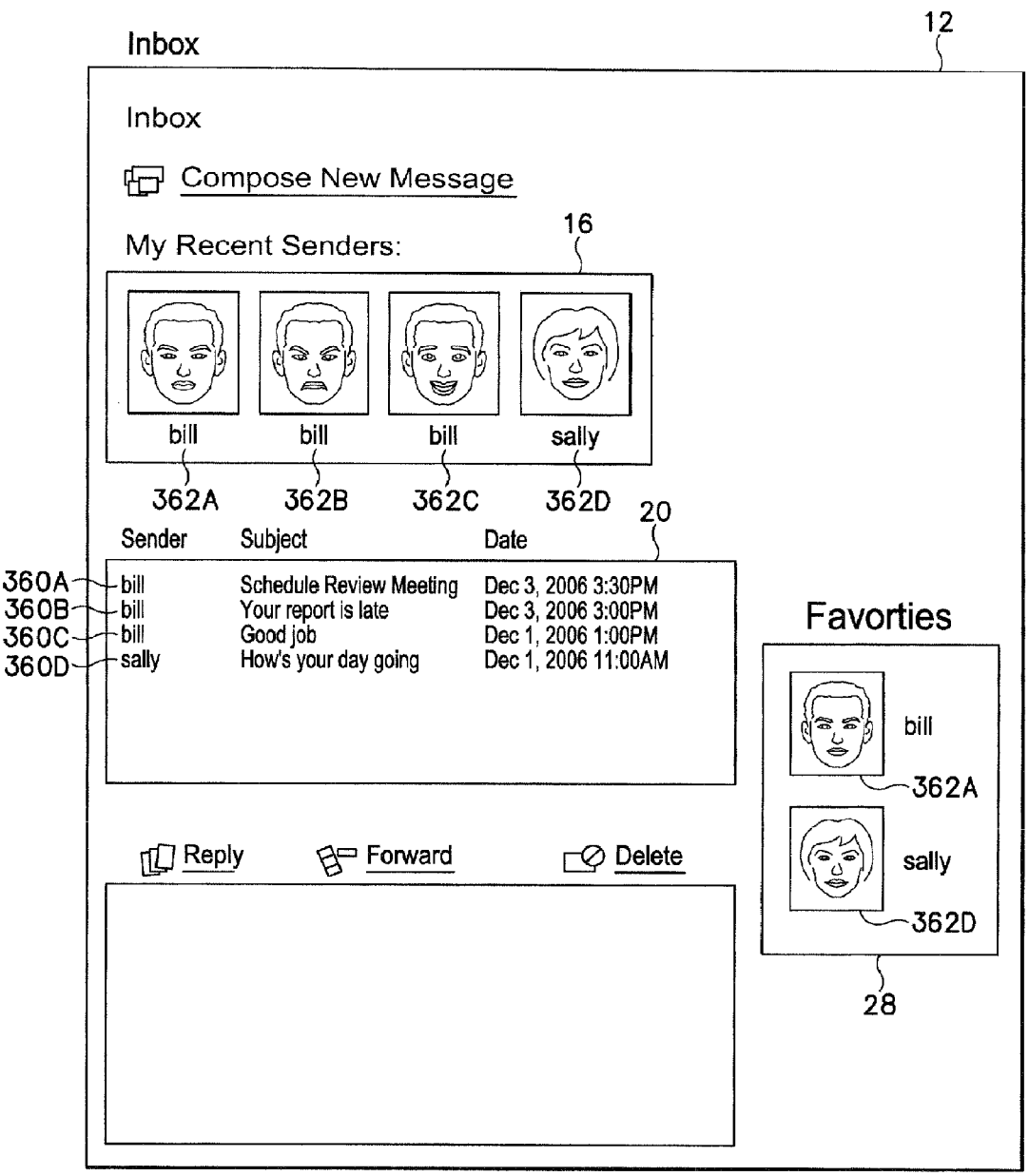
FIG. 16 shows an inbox that displays different photos for the same email sender.

Referring to FIG. 15, the email system receives a new email message in operation 340. Any contact information 306 or image information 258 is identified in the received email message 300 in operation 342. For example, the email system may identify the tag 259 for photo 258. In operation 344, the photo 258 associated with tag 259 is displayed in the recent sender bar 16 of inbox page 12 as shown in FIG. 16 below.

In one embodiment, the email system in operation 342 may recognize the sender signature and then identify any other information 306 in close proximity to the detected signature. The email system may identify the sender signature based either on the sender information in the email message or based on the location of the signature at the end of the email message 300. The email system then searches for any contact information 306 in close proximity to any identified signature. In yet another embodiment, a tag similar to tag 259 may be used to identify contact information 306.

In operation 346, the email system may compare any identified contact information 306 in email message 300 with information that may already exist in the user contacts. The email system may compare any email address, telephone number, street address, etc., identified in the contact information 306 with the currently existing user contacts information.

None of the existing user contact information may correspond with the information 306 identified in the email message 300. Alternatively, the identified contact information 306 may contain more information or different information than what is contained in the user contacts. For example, the user contacts may include a similar name and cellular phone number, but the street address identified in information 306 may be different, or may not exist in the user contacts.

The email system identifies any new or different sender information 306 in operation 348. A message may then be displayed somewhere on the inbox page 12 in operation 350 querying whether the new information 306 should be inserted into the associated user contact. If the addition or update is authorized in operation 352, then the information 306 identified in the email message 300 is added to the associated user contacts in operation 354. The email system may alternatively perform the contact additions or updates automatically without first querying authorization from the user.

FIG. 16 shows one example of the inbox page 12 after the email system has extracted image information from different received email messages. The recent sender bar 16 in this example only contains images for two different senders, Bill and Sally. In this example, email messages with different photos are treated as different senders. This allows different photos for the same sender to be displayed in recent sender bar 16.

For example in FIG. 16, Sally sent the fourth most recent email message and Bill sent the last three more recent email messages. In this example, the photo 362D for Sally is shown on the far right in recent sender bar 16. The three different photos 362C, 362B, and 362A identified in the last three email messages received from Bill are then displayed in order of receipt in the recent sender bar 16.

The images for Bill and/or for Sally may have been extracted from received email messages as described above in FIGS. 14 and 15. Alternatively, if no photo can be extracted from the received email messages, then photos from either the website member profiles or from the user contacts may be used as described above in FIGS. 1-5. Otherwise the email system may display a placeholder or advertisement as also described above.

Displaying different photos 362 for the same sender provides some advantages. For example, the user is quickly notified of email messages from angry senders. In this example, the second most recent email 360B received from Bill contains an angry photo 362B. Accordingly, the user can quickly open and respond to email message 360B before any of the other received email messages 360A, 360C, and 360D.

When there are no identified images attached to the sender email message, then the email system may resort to only showing one image or placeholder for each of the four most recent senders as previously described above. If the same image is attached to each email from a particular sender, then the email system may only display one image 362 for the sender in recent sender bar 16. The recent sender bar 16 may go back to displaying more than one image 362 for the same sender when a received email message contains a different image from the previously uploaded images in the website member profiles or user contacts.

The email system can use any number of existing techniques to identify different photos or images. For example, the number or arrangement of bits in the images can be compared, or the sender email system may attach unique tags or labels 259 (FIG. 14) to each different photo. Other existing techniques known to those skilled in the art can also be used.

The sender may also insert the pictures extracted from the most recently received email messages into favorites list 28. In this case, the photo 362A extracted from the most recent email message received from Bill is used in favorites list 28. This allows the user to quickly see the last facial expression, or alternative email expression, associated with each of the senders in the favorites list 28. A user in sales for example can open up the inbox page 12 and then quickly see if any important clients in favorites list 28 are unhappy. The user may then choose to first open the email messages associated with the unhappy photos 362 thereby more quickly responding to the disgruntled client email messages.

Email System Architectures

In one example, the image based email system is operated on one or more central servers that operate as an Internet website. The website that operates the email system may provide any other type of additional public or private Internet service. For example, the servers operating the email system may also operate a social networking website that allows members to communicate and interact directly with each other, and post personal information and pictures. In another example, the servers operating the email system may comprise part of an private enterprise network. In yet another embodiment, some or all of the email system may operate as a client running locally in a computer terminal which then accesses email information from an enterprise email server. Any other type of web service or email configuration can also be used in conjunction with the image based email system described above.

Figure 17:
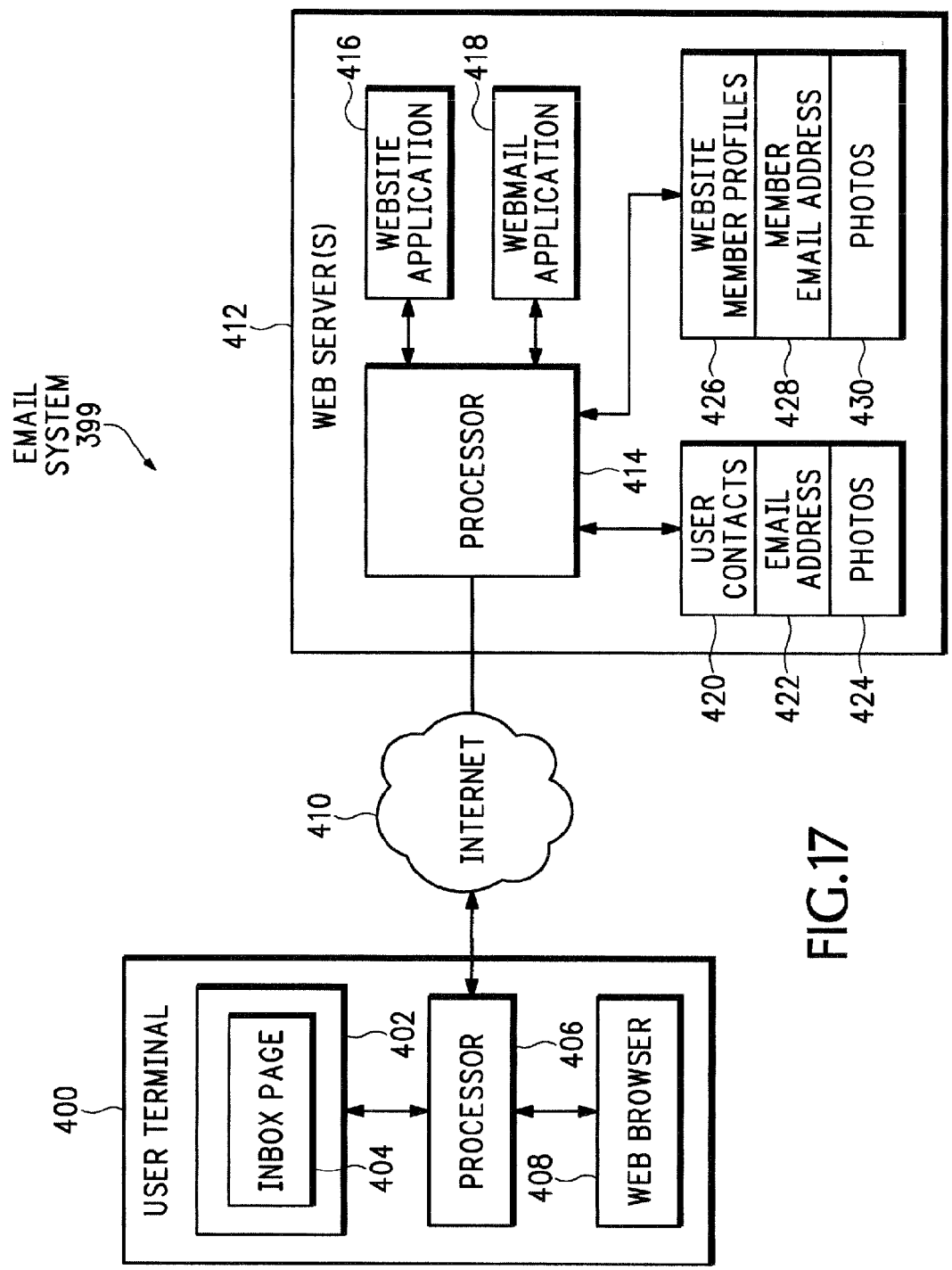
FIG. 17 is a block diagram of a web based email mail system.

Referring to FIG. 17, the email system 399 in one embodiment includes one or more web servers 412 operating one or more processors 414 that execute software for both a website application 416 and a webmail application 418. In one example, the website application 416 operates as the social website described above that allows website members to interact, post photos, and engage in other website activities. Of course, any website application 416 may be associated with the image based email system and in another embodiment the website may primarily only provide the email service described above.

One or more of the web servers 412 include memory that contains the user contacts 420 and website member profiles 426. The user contacts 420 can include, among other things, email addresses 422 and any associated photos 424. The user contacts may also include city, state, and country information as well as different contact phone numbers. The member profiles 426 may include email addresses 428 and associated image 430 for members of website application 416.

A user accesses the website application 416 through a user terminal 400 which may be a Personal Computer (PC), Portable Digital Assistant (PDA), smart phone, or any other type of wired or wireless communication device that is capable of communicating with web servers 412. The user terminal 400 includes a processor 406 that operates a web browser 408 that is operated via screen 402. The web browser 408 accesses the website application 416 via the Internet 410. The user accesses webmail application 418 either directly through web browser 408 or through a link provided by website application 416. The webmail application 418 responds with different email and contact web pages 404, such as any of those described above.

Figure 18:
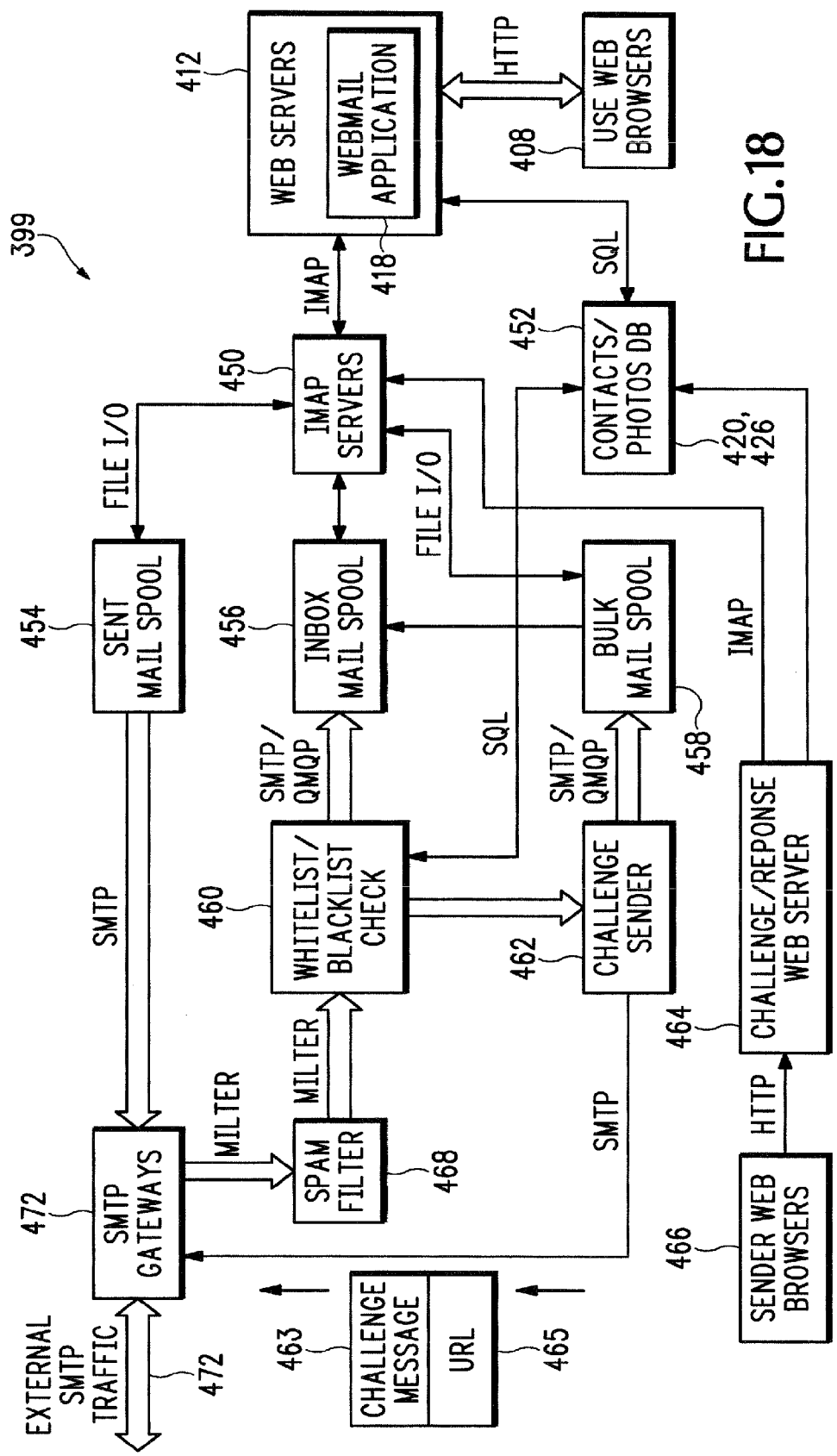
FIG. 18 is a more detailed block diagram of the web based email system shown in FIG. 17.

FIG. 18 describes one embodiment of the web-based email system in more detail. Incoming mail 472 arrives as external Simple Mail Transport Protocol (SMTP) traffic. The SMTP traffic is processed by one or more SMTP gateways 472 and forwarded to a spam filter 468 via a Mail filter (Milter) protocol. The spam filter 468 discards known or obvious spam and forwards the remaining email to a whitelist/blacklist (W/B) operation 460. The W/B operation 460 uses the contact lists in the contacts database 420 to verify the sender is known ("whitelisted"). The user may also blacklist any known contacts by selecting a particular blacklist contact field. In this case, the email system automatically filters all email from the blacklisted contact.

If the email sender is identified in the contacts database 420 and not blacklisted, the email is placed in an inbox mail spool 456. Typically the received email messages in inbox mail spool 456 are shown in the user inbox default page 12 as previously described in FIG. 1. If the email sender is unknown, the email is forwarded to a challenge sender operation 462. For example, the sender email address may not currently be in the user contact list. The challenge sender operation 462 replies back to the email sender via SMTP with a challenge email message 463. The unknown email message is then placed in a bulk mail spool 458. The user can still view these provisional mail messages by selecting a bulk mail icon on an email home page.

The sender challenge email message 463 may contain a Universal Resource Locator (URL) 465 resolving to a challenge/response web server (C/R web server) 464. Loading the URL 465 in message 463 validates the sender and causes the C/R web server 464 to notify the IMAP server 450 to move the challenged mail message from the bulk mail spool 458 to the inbox mail spool 456. The Challenge/Response web server may also update user contacts 420 when a sender responds to the challenge message 463 with any information that may be in the challenged email message.

Loading the URL 465 may simply require the sender to click on the link for the URL 465 in the challenge email message 463. This challenge/response process filters automated server generated email messages since there will be no person at the email sender address to respond to the challenge message 463. However, the challenge response only requires a human sender to click on the URL 465. Thus, actual persons, who just happen to be unknown senders, are more likely to respond to the challenge 463 and eventually contact the user.

One of the email pages may display options for displaying email from either the bulk mail spool 458 or the inbox mail spool 456. As mentioned above, the inbox mail spool 456 may typically be configured as the default.

A user accesses web browser 408 to interact with the webmail application 418 via one of the email web servers 412. The web servers 412 access the inbox mail spool 456, bulk mail spool 458, and sent mail spool 454, through one or more Internet Message Access Protocol (IMAP) servers 450. In addition, any email address used for composing and sending email messages may be automatically added to the user contacts in the contacts database 420 by webmail application 418.

The user also manages contacts in database 420 by accessing the webmail application 418 via web browser 408. The user may add or remove people or entries from the contacts in database 420, effectively whitelisting or blacklisting that person or entity. The user can also manage and upload photos associated with people and entities in the contacts list.

Enterprise Email System

Figure 19:
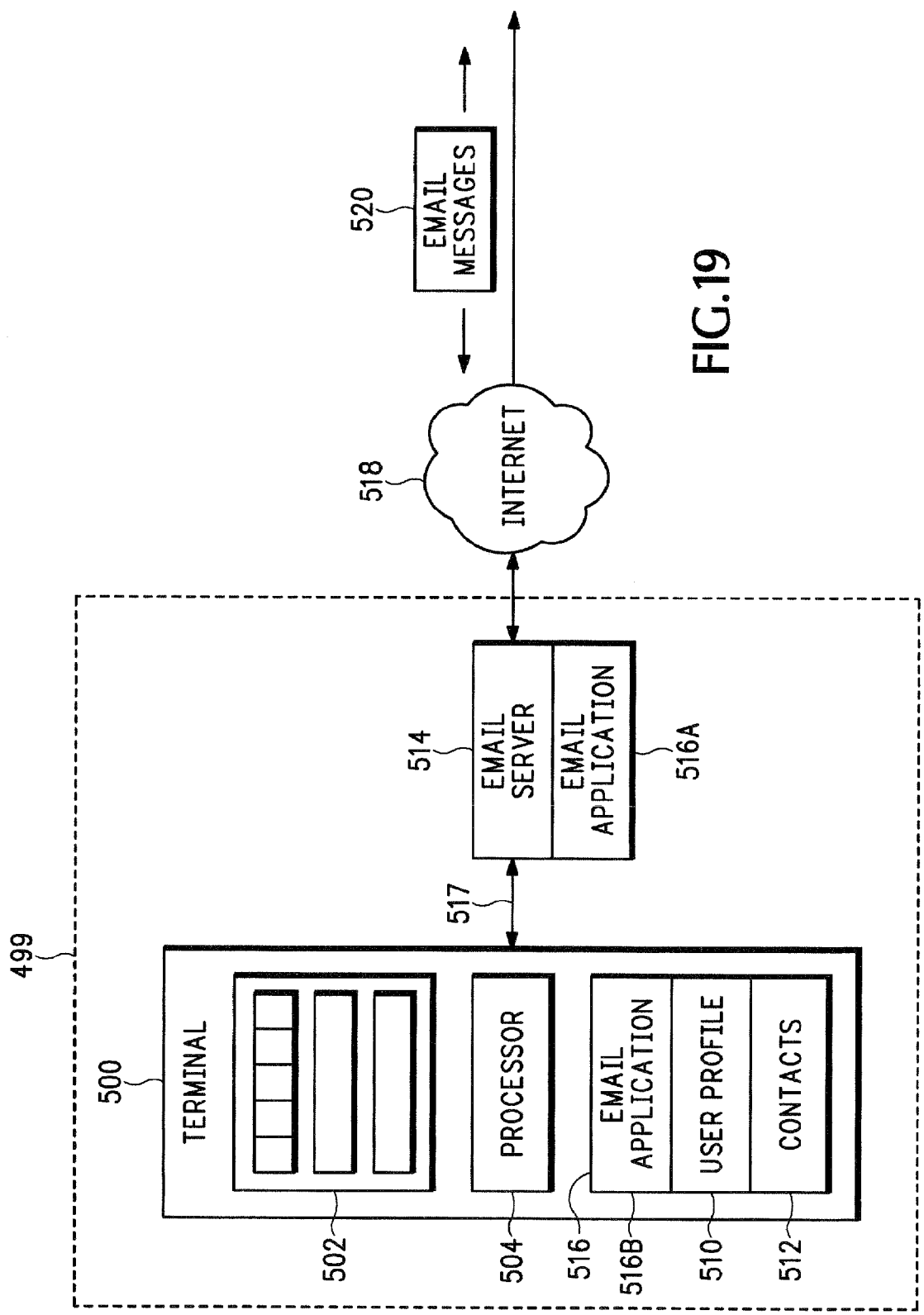
FIG. 19 is a block diagram of the email mail system when used in a local enterprise network.

FIG. 19 describes how the email system described above may be used in a non-web based application, such as in an enterprise network 499. In this embodiment, an email server 514 operates within the enterprise network 499 and executes an email application 516A that performs some or all of the email operations described above. The email server 514 is coupled through a local area network or wireless network 517 to multiple terminals 500 and receives and sends emails 520 via Internet 518.

Each terminal 500 includes a processor 504 that executes another portion of the email application 516B. The processor 504 also provides a user interface 502 that displays the different email pages described above. The terminal 500, or alternatively the email server 514, stores the user profile 510 and contacts 512 that are used by email application 516 for performing the email operations described above.

The email server 514, when executing email application 516A, performs some or all of the email operations described above. However, in one example, the email server 514 may not provide the specific email operations associated with a public website. For example, the email application 516 may not search through website member profiles for associated photos and may only search for sender photos in user profile 510.

The system described above can use dedicated processor systems, micro controllers, programmable logic devices, or microprocessors that perform some or all of the operations.

Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:

storing in a database on a network a plurality of profiles each corresponding to a respective member of a social networking website, wherein each profile specifies at least contact information for its respective social networking website member and an image selected by its respective social networking website member;

after said storing, receiving, at a network device, an electronic message originating from a user terminal remote from the network device;

processing the received electronic message to enable at least a portion of the electronic message to be displayed on a user terminal associated with a destination of the electronic message;

comparing sender information of the received electronic message to the database to identify a corresponding one of the profiles; and responsive to identifying the corresponding one of the profiles, causing the image of the corresponding one of the profiles to be displayed by the user terminal associated with the destination concurrently with the displayed electronic message portion.

2. The method according to claim 1, wherein the concurrently displayed image is a picture of the electronic message sender.

3. The method according to claim 1, wherein the electronic message is a first electronic message of a first, second, and third sequentially received electronic message associated with the same sender information, the image is a first image of a first, second, and third image respectively associated with the first, second, and third electronic messages, and the method further comprises:

displaying the first image concurrently with the first electronic message portion in a first position on an electronic message display page;

displaying the second image in the first position on the electronic message display page and moving the first image to a second position on the electronic message display page adjacent to the first position; and displaying the third image in the first position, moving the second image to the second position, and moving the first image to a third position on the electronic message display page adjacent to the second position.

4. The method according to claim 3, including:
displaying the first, second, and third images at the same time in a sender bar;
receiving a new electronic message from a new sender;
displaying a new image associated with the new sender at the beginning of the sender bar;
moving each of the first, second, and third images currently displayed in the sender bar over one location either in back of or below the new image associated with the new sender; and
displaying the new image, and the first, second, and third images at the same time in the sender bar.

5. The method according to claim 1, including, responsive to receiving a user selection of the displayed image, displaying in a message list only those electronic messages having the same sender information.

6. The method according to claim 5, including:
detecting movement of a cursor over the displayed image and detecting selection of the displayed image using the cursor; and
in response to said detected movement of the cursor over the displayed image and said detected selection, displaying the sender information.

7. The method according to claim 6, including:
displaying a tooltip providing electronic message options for the sender information;
tracking the number of unread electronic messages for the sender information; and
displaying the number of tracked unread messages in the tooltip.

8. The method according to claim 6, including:
displaying a tooltip providing electronic message options for the sender information; and
displaying an option in the tooltip to add a current image of the corresponding profile of the sender information in a favorites list of constantly displayed images and adding the sender information to a contacts list.

9. The method according to claim 6, including:
displaying a tooltip providing electronic message options for the sender information;
displaying a new electronic message option in the tooltip for sending an electronic message to the sender information; and
presenting a new electronic message compose page that includes the sender information pre-populated in response to selection of the new electronic message option.

10. The method according to claim 1, including:
displaying the image in a senders bar concurrently with other images, wherein the images in the senders bar continue to be replaced with images of more recently received electronic messages; and
displaying a favorites list that persistently and simultaneously displays the images for a selected subset of multiple different senders that have sent electronic messages to the destination, wherein the favorites list and the senders bar are spaced apart and displayed concurrently.

11. The method according to claim 10, including:
monitoring a number of electronic messages received from the sender information; and
responsive to the monitored number reaching a threshold amount within a predetermined time period, automatically displaying the image in the favorites list.

12. The method according to claim 1, including:
displaying a new electronic message composition page for sending a new electronic message;
assigning points to a user for sending the new electronic message;
displaying virtual gift icons in the electronic message composition page;
associating points with the virtual gift icons;
identifying attachment of one of the virtual gift icons to the new electronic message; and
subtracting the points associated with the virtual gift from the user when the new electronic message is sent.

13. The method according to claim 1, including:
identifying sender contact or image information responsive to receiving the electronic message;
adding any identified sender contact information to a sender contact list; and
displaying any identified image information in a recent sender bar simultaneously with other displayed images representing other different electronic message senders of other most recently received electronic messages.

14. The method according to claim 13, further comprising:
receiving a first electronic message containing image data representing a first facial expression;
displaying the image data of the first electronic message in the recent sender bar;
receiving a second electronic message containing image data representing a second facial expression;
comparing the second facial expression with the first facial expression;
displaying both the image data from the first electronic message and the image data from the second electronic message concurrently in the recent sender bar if the second facial expression is different from the first facial expression; and
displaying only the image data from the first electronic message in the recent sender bar and not displaying the image data from the second electronic message if the second facial expression is the same as the first facial expression.

15. The method of claim 1, wherein the image is displayed in a first section and a first location of an electronic message viewing page different from a second section and second location of the electronic message viewing page that displays a message list of sender names and subject lines for the received electronic messages, and different from a third section and third location of the electronic message viewing page that shows a body of selected electronic messages.

16. The method of claim 1, further comprising displaying the image responsive to delivering the electronic message without having to first open up the delivered electronic message.

17. The method of claim 1, further comprising, responsive to receiving an additional electronic message that does not correspond to any of the images of any of the profiles, displaying a random place holder or advertisement for the additional electronic message.

18. The method of claim 15, further comprising:
persistently displaying images for a set of preferenced electronic message senders in a favorites bar, wherein the images displayed in the favorites bar are displayed simultaneously with the image displayed in the first section, and wherein the first section and the favorites bar are displayed in different locations in the viewing page; and
automatically opening an electronic message composition page in response to selection of one of the images in the favorites bar, wherein a destination field in the electronic message composition page is preaddressed to a destination corresponding to the selected image in response to said selection thereof.

19. The method according to claim 1, including:
assigning points to the members that send electronic messages to other ones of the members;
displaying multiple different virtual gift icons in an electronic message composition page;
associating points with the virtual gift icons;
identifying when one of the virtual gift icons is attached to a new electronic message; and
subtracting the points associated with the identified one of the virtual gift icons from the points previously assigned to one of the website members sending the electronic message.

20. An system, comprising:
a processor configured to:
store in a database on a network a plurality of profiles each corresponding to a respective member of a social networking website, wherein each profile specifies at least contact information for its respective social networking website member and an image selected by its respective social networking website member;
after said storing, receive, at a network device, an electronic message originating from a user terminal remote from the network device;
process the received electronic message to enable at least a portion of the electronic message to be displayed on a user terminal associated with the destination;
compare a sender information of the received electronic message to the database to identify a corresponding one of the profiles; and
responsive to identifying the corresponding one of the profiles, cause the image of the corresponding one of the profiles to be displayed by the user terminal associated with the destination concurrently with the displayed electronic message portion.

21. The system of claim 20, wherein the processor comprises a plurality of processors distributed over the network device and the user terminal associated with the destination.

22. The system of claim 21, wherein the processor operates on the network device.

23. The system of claim 20, wherein the processor is further configured to:
responsive to receiving a user selection of the displayed image, display in a message list only those electronic messages received from the sender information.

24. The system of claim 23, wherein the processor is further configured to:
detect movement of a cursor over the displayed image and detect selection of the displayed image using the cursor; and
in response to said detected movement of the cursor over the displayed image and said detected selection, display the sender information.

25. The system of claim 23, wherein the processor is further configured to:
display a tooltip providing electronic message options for the sender information;
track the number of unread electronic messages for the sender information; and
display the number of tracked unread messages in the tooltip.

26. The system of claim 23, wherein the processor is further configured to:
display a tooltip providing electronic message options for the sender information; and
display an option in the tooltip to add a current image of the corresponding profile of the sender information in a favorites list of constantly displayed images and add the sender information to a contacts list.

27. The system of claim 23, wherein the processor is further configured to:
display a tooltip providing electronic message options for the sender information;
display a new electronic message option in the tooltip for sending an electronic message to the sender information; and
present a new electronic message compose page that includes the sender information pre-populated in response to selection of the new electronic message option.

28. The system of claim 20, wherein the processor is further configured to:
display the image in a senders bar concurrently with other images, wherein the images in the senders bar continue to be replaced with images of more recently received electronic messages; and
display a favorites list that persistently and simultaneously displays the images for a selected subset of multiple different senders that have sent electronic messages to the destination, wherein the favorites list and the senders bar are spaced apart and displayed concurrently.

29. The system of claim 28, wherein the processor is further configured to:
monitor a number of electronic messages received from the sender information;
responsive to the monitored number reaching a threshold amount within a predetermined time period, automatically display the image in the favorites list.

30. The system of claim 20, wherein the processor is further configured to:
display a new electronic message composition page for sending a new electronic message;
assign points to a user for sending the new electronic message;
display virtual gift icons in the electronic message composition page;
associate points with the virtual gift icons;
identify attachment of one of the virtual gift icons to the new electronic message; and
subtract the points associated with the virtual gift from the user when the new electronic message is sent.

31. The system of claim 20, wherein the processor is further configured to:
identify sender contact or image information responsive to receiving the electronic message;
add any identified sender contact information to a sender contact list; and
display any identified image information in a recent sender bar simultaneously with other displayed images representing other different electronic message senders of other most recently received electronic messages.

32. The system of claim 31, wherein the processor is further configured to:
receive a first electronic message containing image data representing a first facial expression;
display the image data of the first electronic message in the recent sender bar;
receive a second electronic message containing image data representing a second facial expression;
compare the second facial expression with the first facial expression;

display both the image data from the first electronic message and the image data from the second electronic message concurrently in the recent sender bar if the second facial expression is different from the first facial expression; and display only the image data from the first electronic message in the recent sender bar and not displaying the image data from the second electronic message if the second facial expression is the same as the first facial expression.

33. The system of claim 20, wherein the image is displayed in a first section and a first location of an electronic message viewing page different from a second section and second location of the electronic message viewing page that displays a message list of sender names and subject lines for the received electronic messages, and different from a third second and third location of the electronic message viewing page that shows a body of selected electronic messages.

34. The system of claim 20, wherein the processor is further configured to display the image responsive to delivering the electronic message without having to first open up the delivered electronic message.

35. The system of claim 33, wherein the processor is further configured to, responsive to receiving an additional electronic message that does not correspond to any of the images of any of the profiles, display a random place holder or advertisement for the additional electronic message.

36. The system of claim 33, wherein the processor is further configured to:

persistently display images for a set of preferenced electronic message senders in a favorites bar, wherein the images displayed in the favorites bar are displayed simultaneously with the image displayed in the first section and wherein the first section and the favorites bar are displayed in different locations in the viewing page; and automatically open an electronic message composition page in response to selection of one of the images in the favorites bar, wherein a destination field in the electronic message composition page is preaddressed to a destination corresponding to the selected image in response to said selection thereof.

37. The system of claim 20, wherein the processor is further configured to:

assign points to the members that send electronic messages to other ones of the members;

display multiple different virtual gift icons in an electronic message composition page;

associate points with the virtual gift icons;

identify when one of the virtual gift icons is attached to a new electronic message; and subtract the points associated with the identified one of the virtual gift icons from the points previously assigned to one of the website members sending the electronic message.

* * * * *